Dec. 19, 1950 M. WALLACE 2,534,844
GATED TRIPLE SYNCHROMETRIC SYSTEM
Filed Nov. 26, 1947 9 Sheets-Sheet 1
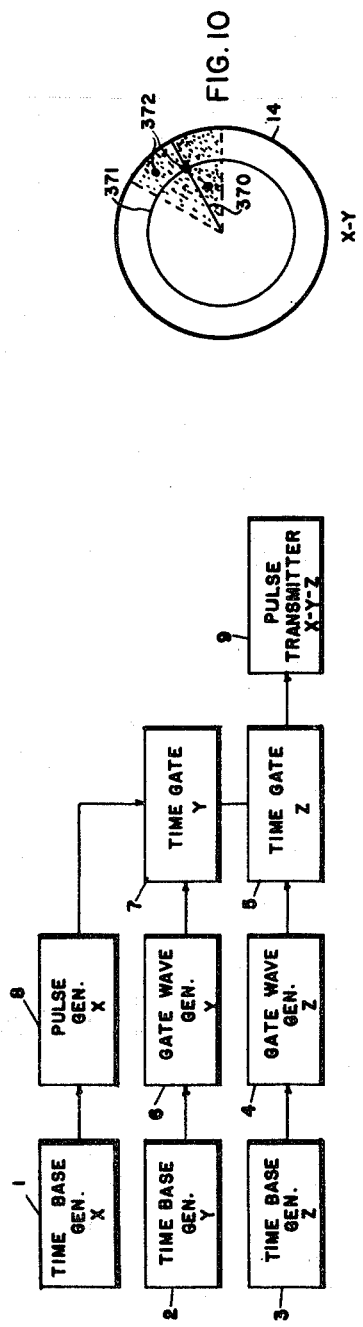
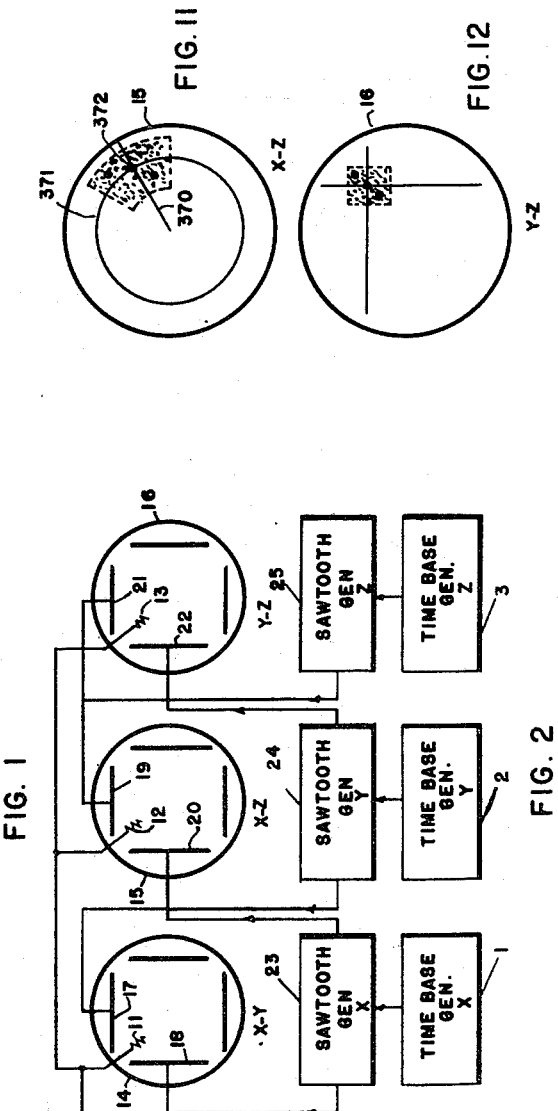
INVENTOR.
MARCEL WALLACE

INVENTOR.
MARCEL WALLACE

Dec. 19, 1950  M. WALLACE  2,534,844
GATED TRIPLE SYNCHROMETRIC SYSTEM
Filed Nov. 26, 1947  9 Sheets-Sheet 3

INVENTOR.
MARCEL WALLACE
BY

Dec. 19, 1950   M. WALLACE   2,534,844
GATED TRIPLE SYNCHROMETRIC SYSTEM
Filed Nov. 26, 1947   9 Sheets-Sheet 4

INVENTOR.
MARCEL WALLACE
BY

Dec. 19, 1950     M. WALLACE     2,534,844
GATED TRIPLE SYNCHROMETRIC SYSTEM
Filed Nov. 26, 1947     9 Sheets-Sheet 5

INVENTOR.
MARCEL WALLACE

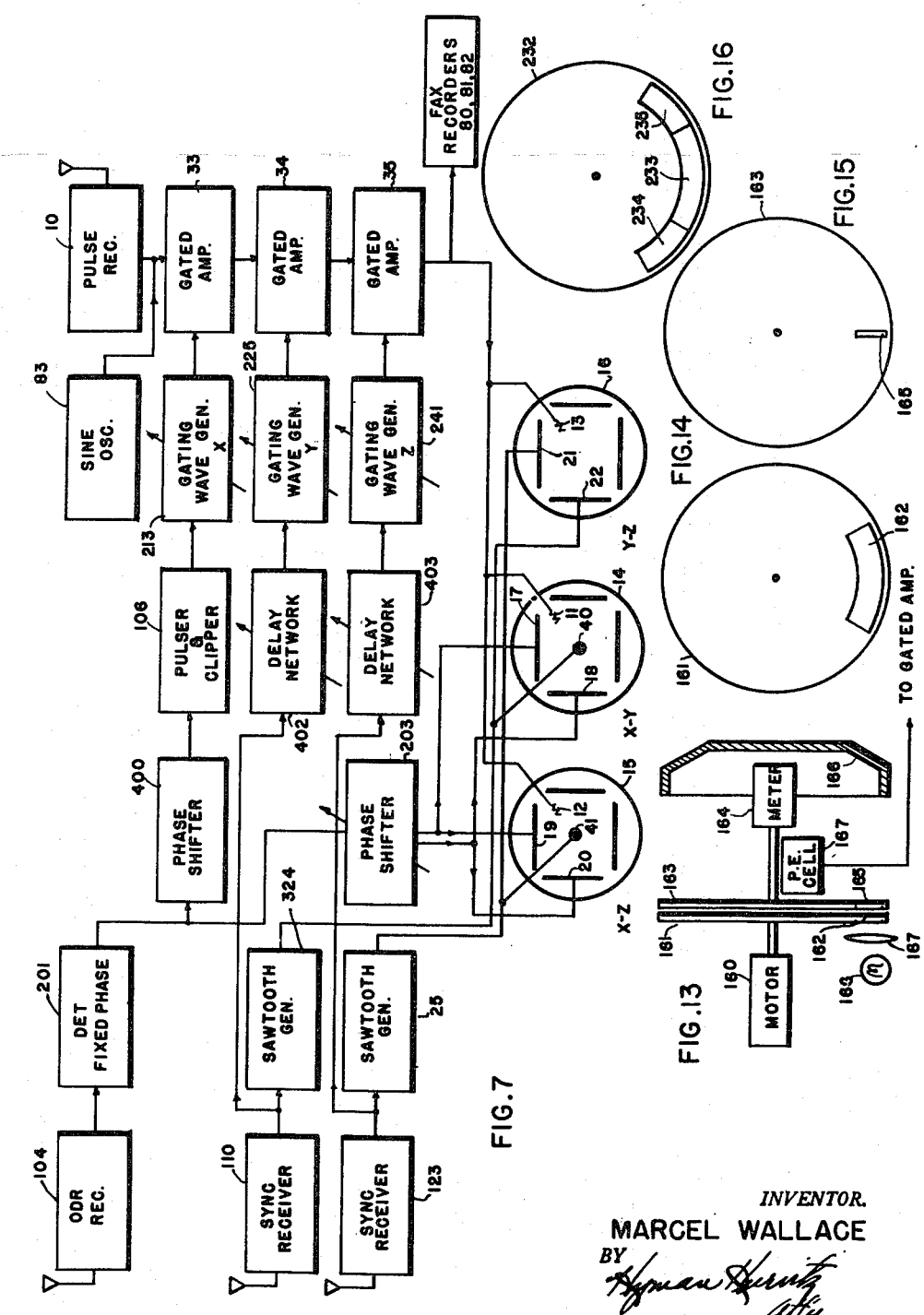

INVENTOR.
MARCEL WALLACE

Patented Dec. 19, 1950

2,534,844

UNITED STATES PATENT OFFICE 2,534,844

GATED TRIPLE SYNCHROMETRIC SYSTEM

Marcel Wallace, Fairfield County, Conn., assignor of one-half to Panoramic Radio Corporation, Mount Vernon, N. Y., a corporation of New York Application November 26, 1947, Serial No. 788,140

46 Claims. (Cl. 343—112)

This application is a continuation-in-part of my prior application entitled Dual Synchrometric System, filed October 10, 1947, and to which has been assigned Serial No. 779,174, and of my further prior application entitled Gated Dual Synchrometric System, filed October 24, 1947, and to which has been assigned Serial No. 781,837.

The present invention relates generally to telemetric systems and more particularly to gated triple synchrometric telemetric systems wherein values of three measurable quantities are transmitted in terms of the time position of a single transmitted pulse, which may be translated at a remote point into an indication or a record of values of the three variable quantities, and wherein at the remote point determinable ranges of values of any one or more of the quantities may be excluded from the indications, or from the record.

Broadly described, my invention involves production of three sets of pulses, each set pertaining to one of the measured quantities, and the time positions of pulses within each set being determined in accordance with the value of one of the quantities. The time position of pulses within the separate sets is determined, however, with respect to entirely different time bases or basic time intervals, having relatively to one another durations of different orders of magnitude, and which may be of integral multiple length relation one of the other, and of locked relative phase, or which may be entirely random in relation to time duration and in respect to relative phase.

In order to identify these time intervals they may be assigned letters of the alphabet. So the shortest of the time intervals may be denoted the $x$ time interval, the intermediate time interval may be identified by the letter $y$, and the longest of the time intervals may be identified by the letter $z$. The variable quantities may also be identified by the letters $x$, $y$ and $z$, the $x$ quantity pertaining to $x$ time interval, the $y$ quantity pertaining to the $y$ time interval, the $z$ quantity pertaining to the $z$ time interval.

If now we utilize the $z$ quantity to establish a gating wave having a duration equal to the $y$ time and a time position within the $z$ time interval determined by the value of the $z$ quantity; and if, further, we utilize the $y$ quantity to establish a gating wave within the $y$ time intervals which has a duration equal to the $x$ time interval and a time position with respect to the $y$ time interval which is determined by the value of the $y$ quantity; and if, still further, we establish a pulse having a time position with respect to the $x$ time quantity which is determined by the $x$ quantity; and if we pass the latter pulse through a pair of cascaded gating amplifiers the first of which is gated open by the $z$ gating wave, and the second of which is gated open by the $y$ gating wave, the output of the cascaded amplifiers being applied to a transmitter for triggering the latter, the transmitter will be found to transmit a single pulse having a time position with respect to each of the three time intervals $x$, $y$, $z$ which bears a definite relation to the values of the three measurable quantities $x$, $y$, $z$, and is representative of these values.

At the receiving station, which may be on the ground, or on an aircraft, and in the latter case may be combined with the transmitter, the time position of each received pulse may be measured with respect to each of the time base intervals $x$, $y$, $z$ separately to enable recovery of the values of $x$, $y$ and $z$. The pulse receivers at the receiving and indicating stations may each be provided with a triplet of cascaded channels which are in the nature of gated amplifiers and which are normally closed but which may be gated open in response to gating waves. The gating waves themselves may be provided in various ways. For example, a gating wave may be provided at any station under control of the value of the quantities $x$, $y$ and $z$ at those stations in a manner similar to the production of gating waves at the transmitters, i. e., one gating wave may be produced during each of the basic time intervals of the system in response to the value of one of the quantities. Received pulses may then be passed through the gated amplifiers in cascade, eliminating those pulses which do not have time positions simultaneously in all of the basic time intervals of the system which bear predetermined relations to the time position of the transmitted pulse, with respect to the three base time intervals, at that same station. Additionally further time gates may be provided which may be manually controlled in respect to their time positions within each of the basic time intervals, and also in respect to time duration within each of the basic time intervals, permitting acceptance of telemetric pulses from remote stations within any desired ranges of each of the quantities' values, simultaneously, and excluding telemetric pulses having values falling outside the desired ranges.

My system may find particular application to the transmission from one point to another, or from a series of points to a central station, or from each of a series of points to the remaining ones of said series of points, of information of a navigational character. When applied to air navigation, for example, the three quantities $x$, $y$ and $z$ may represent bearing, range and elevation of each of the aircraft, respectively. When applied to surface navigation the quantity $z$ instead of representing elevation may represent identity of a craft, for example, and the quantities $x$ and $y$ may represent latitudes and longitudes of the crafts' position. Alternatively again, one of the quantities $x$, $y$ and $z$ may be utilized for transmitting speed or direction of travel of a craft while the other two quantities represent position in terms of bearing and range with respect to a fixed geographic location, or latitude and longitude. Many other possible applications of the present telemetric system will suggest themselves to those skilled in the pertinent art, the above suggestions being merely provided by way of example.

Various ways of indicating and/or recording the values of the telemetric quantities may be utilized. For example, the value of each of the quantities may be recorded on a facsimile type recorder, each of the recorders being synchronized with respect to one only of the basic time intervals $x$, $y$ and $z$, thus providing a record of the values of the quantities, $x$, $y$, $z$ with respect to time. Additionally, or alternatively, the time positions of received pulses may be presented on the face of a cathode ray tube oscilloscope, in which case a single oscilloscope may be utilized to present jointly the values of two quantities. If, for example, the quantities $x$, $y$ and $z$ represent respectively bearing and range with respect to a predetermined location, and elevation, of an aircraft, we may provide displays on the faces of three cathode ray tube oscilloscopes. On the first of the oscilloscopes may be provided a display representing range against bearing in polar coordinates; on the face of the second of the oscilloscopes may be presented a display of range against elevation in polar coordinates; and on the face of the third oscilloscope may be presented a display of range against elevation in rectangular coordinates. Alternatively all the displays may be in rectangular coordinates.

Since the time position of a single pulse with respect to three different basic time intervals represents the values of three quantities, in our example range, bearing and elevation, it will be clear that gating of a pulse into the system results in the display of the interrelationship of all the quantities, on the faces of a plurality of oscilloscopes, and the creation of a time record of the values of all the quantities. If, on the other hand, a given pulse is refused admittance by reason of its time position within any one of the time base intervals $x$, $y$, $z$, its value is not indicated or displayed in any manner whatever. Accordingly, it is possible, in the present system, to establish a series of gates in cascade, one for each of the quantities $x$, $y$, $z$, and to admit to any receiver-indicator only pulses corresponding simultaneously with a given range of values in each of the quantities.

As a further feature of the present invention, I transmit from a ground station to the various aircraft of the system terrain charts or other information, such as paths or routes to be followed by aircraft, or notice of the presence of obstacles, and the like, by transmission of time position modulated signals representative of the features of the chart, a plurality of charts being provided, each carrying information pertinent to one altitude or small range of altitudes only, and transmission of the information from the separate charts being transmitted during portions of the $z$ time base period which are appropriate to the chart, by reason of correspondence between the altitude pertinence of the chart and the altitude significance of the particular portion of the $z$ time base during which transmission takes place.

The maps may be scanned in respect to bearing and range, by means of a polar scanning iconoscope, synchronized with the $x$ and $y$ time base periods utilized in the system, whereby the plots may be superimposed, at the various aircraft of the system, on aircraft position representative information otherwise present in the indicators aboard the craft.

It is accordingly a primary object of the present invention to provide a telemetric system wherein the time position of a single pulse represents the values of three discrete quantities.

It is a further object of the invention to provide a gated synchrometric telemetering system utilizing a single recurring pulse time position as the measure of the values of three quantities.

It is a further object of the invention to provide a gated time position modulation system for telemetering wherein the time position of a single pulse is determined simultaneously with respect to three discrete time intervals.

It is still a further object of the invention to provide a gated time position modulation telemetric system wherein the time position of a single pulse is determined simultaneously with respect to three distinct time intervals and wherein gating means are provided for enabling at a telemetric receiver the reception or the rejection of any transmitted pulse in accordance with its time position with respect to one or more of the time intervals.

It is still another object of the invention to provide a synchrometric system of communication having a receiving and translating system for translating the time position of a single pulse into indications of the relationship between pairs of values of a set of three values, and wherein the receiving and translating system may be time gated with respect to each of the different time base intervals separately or simultaneously.

More specifically, it is an object of the invention to apply the principles and concepts above discussed to improved systems of navigation, and particularly to improved systems of air navigation, wherein the time position of a transmitted pulse originating from any craft is representative with respect to its time position in three separate basic time intervals of three quantities pertaining to that craft, these quantities involving, for example, any combination of identification, range, bearing, elevation, heading, or the like.

It is another object of the invention to provide a system of navigation of the character stated in the previous paragraph wherein telemetric or navigational information is transmitted from each of a plurality of craft to the remainder of the plurality, or from each of a plurality of craft to a central station.

The above and further objects and features of the invention will become evident upon study of the following details and description of various embodiments of the invention, especially when taken in conjunction with the accompanying drawings, wherein:

Figure 1 is a functional block diagram, illustrating the relationship between the elements required for transmitting triple synchrometric pulses, in accordance with the invention;

Figure 2 is a functional block diagram illustrating a simple form of ungated receiver-indicator for receiving triple synchrometric pulses, and for translating each of the pulses into visible indications of the values of a triplet of quantities;

Figure 7 is a functional block diagram of a receiver indicator system, in accordance with the invention, which is particularly suitable for use at a ground station by reason of the fact that the instrument is not self gated;

Figure 8 is a circuit diagram of a gating wave generator, utilized as an element of various embodiments of the invention;

Figure 9 is a timing diagram useful in connection with the exposition of the operation of the circuit illustrated in Figure 8;

Figures 10, 11 and 12 represent the appearance of the faces of various of the indicators comprised in gated receiver indicator systems, in accordance with the invention;

Figure 13 is a view partly in side elevation, and partly conventionalized, of a mechanical form of square wave generator, utilized in various embodiments of the system of the invention;

Figure 14 is a front view in elevation of a disc element of the structure of Figure 13;

Figure 15 is a view in front elevation of a further disc element of the structure of Figure 13;

Figure 16 is a view in front elevation of a variant of the disc element of Figure 14;

Figure 3:
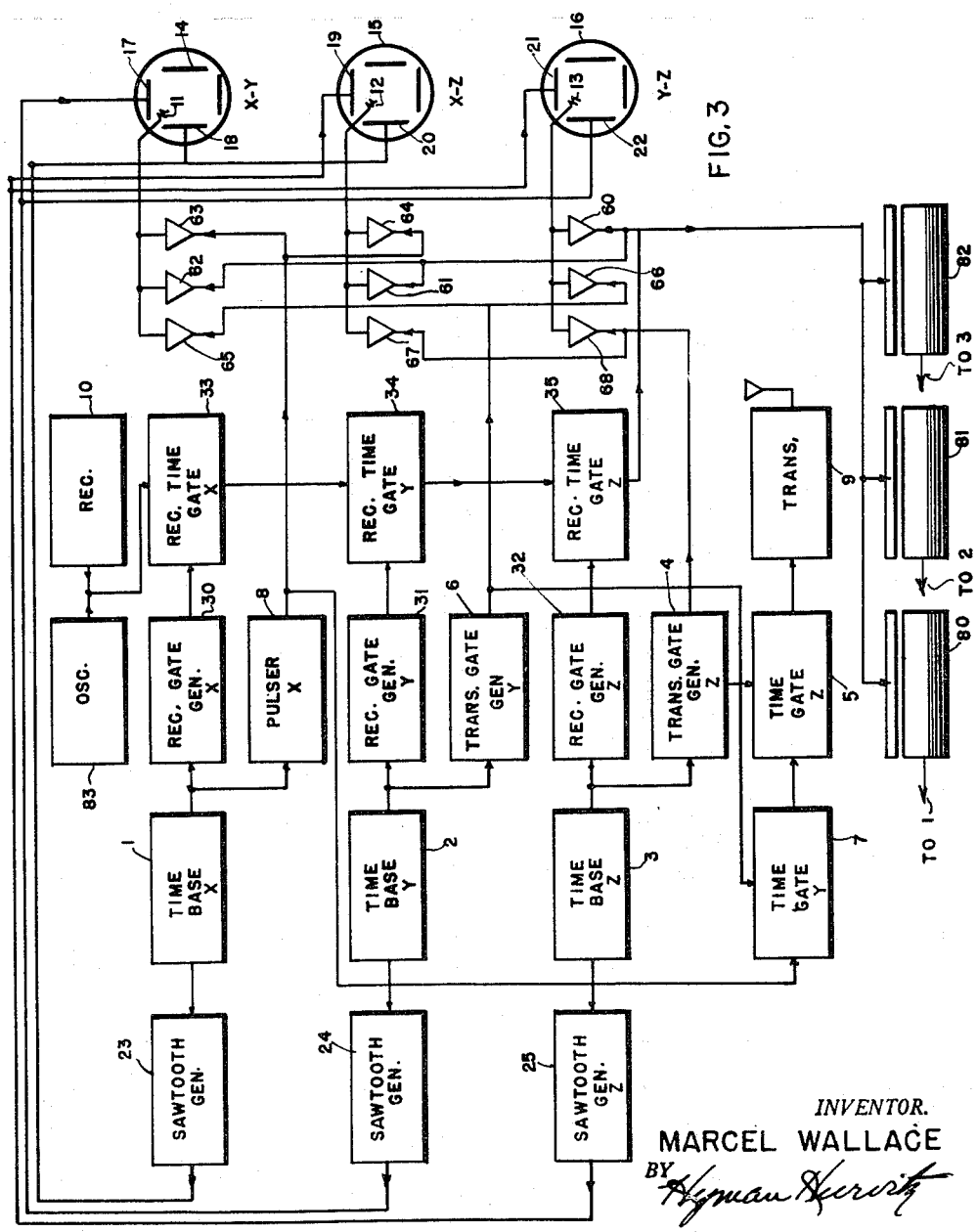
Figure 3 is a functional block diagram of a self time gated transmitter-receiver-indicator combination, combining the features of the devices illustrated in Figures 1 and 2.

Reference is now made particularly to Figure 1 of the drawing wherein is shown in simplified form and in functional block diagram a transmitting station in accordance with the present invention. Reference numerals 1, 2 and 3 represent respectively time base generators for generating time bases $x$, $y$ and $z$, corresponding respectively with the short, intermediate and long time intervals utilized in the present system as base time intervals. I do not desire to be restricted to any specific value or time interval or to any specific ratios between time intervals used in the present system and accordingly the time base generators $x$, $y$ and $z$ may be synchronized separately each from a different synchronizing source, which is common to all the stations of the present system. Alternatively, the time base generators $z$ may be synchronized, at each of the stations, and the time base generators $x$ and $y$ synchronized from the time base generator $z$ by any time division process. If, for example, the time base generators $z$ were taken to comprise an electric motor synchronized at a given rate the time base generators $x$ and $y$ might be mechanical elements driven from the synchronized motor by gearing. If, on the other hand, the time base generator $z$ represented an electrical wave of a given frequency or time position generated by an electrical oscillator, the time bases $x$ and $y$ might be developed from that wave by a process of frequency multiplication.

The output of the time base generator $z$ is applied to a gating wave generator $z$ denoted by the reference numeral 4 and which has the function of establishing within the time base provided by the time base generator $z$ a gating wave, having a duration precisely equal to the duration of the basic time interval $y$ and having a time position within the time base $z$ determined by the value of a measurable quantity $z$.

The output of the gating wave generator $z$ is applied to a time gate $z$ identified by the reference numeral 5, which is opened for the passage of signals therethrough during the time of duration of the gating wave $z$. The time base established by the time base generator $y$ is applied to a gating wave generator $y$, identified by the reference numeral 6, which has the function of generating a gating wave having a time duration equal to the duration of the time base $x$ and a time position with respect to the time interval $y$ which is determined by the value of a further measurable quantity $y$. The output of the gating wave generator 6 is applied to a time gate 7 and serves to open the latter for the duration of the gating wave $y$. The time base generator $x$ establishes a basic time interval $x$ for the pulse generator $x$ which generates a pulse at a time within the time base interval $x$ having a time position determined by the value of a measurable quantity. The output of the pulse generator 8 is applied to the time gate 7 and those pulses generated by the pulse generator 8 which pass through the time gate 7 are applied to the time gate 5 for passage therethrough. Those pulses which pass through the time gate 5 are applied as triggering pulses to a transmitter 9 and are transmitted either over wires or by radio to a receiving and indicating station. Since the $y$ gating wave generator 6 opens the $y$ time gate 7 for a time period equal to exactly the time base period $x$, it will be evident that only one of the pulses provided by the $x$ pulse generator 8 will be enabled to pass the $y$ time gate 7; and since likewise the $z$ gating wave generator 4 opens the $z$ time gate 5 for a time equal precisely to the time period $y$, it will be evident that during only one of the time periods established by the $y$ time gate 7 will a pulse generated by the $x$ pulse generator 8 be enabled to pass through the $z$ time gate 5. Accordingly, the time position of a transmitted pulse, with respect to the time base $z$, will fall within the time of establishment of gating wave $z$, and will fall, with respect to the time base $y$, within the time of establishment of gating wave $y$, and will correspond with respect to the time base $x$ in accordance with its own position with respect to the time base $x$. The time position of the single transmitted pulse, accordingly, represents three quantities, by reference to three different time bases.

The operation of the system of Figure 1 will be made more evident by taking a specific example. Let us assume that the $z$ time base generator 3 establishes a time base extending for a period of one second, that the $y$ time base generator 2 establishes a time base extending for a period of $\frac{1}{10}$ of a second and that the $x$ time base generator 1 establishes a time base extending for a period of $\frac{1}{100}$ of a second.

Let us further assume for the sake of simplicity that the time bases, $x$, $y$, $z$, all have a common starting point. During a time base interval of one second, accordingly, the time base generator 3 will establish a single time base. The time base generator 2 on the other hand will establish ten consecutive repetitive time bases which altogether coincide with the one second time interval established by the generator 3. The time base generator 1 on the other hand will establish one hundred basic time intervals $x$ within this same time period of one second. The gating wave generator 4 will now establish a gating wave extending for $\frac{1}{10}$ of a second and having a time position within the one second period representing a given quantity $z$, and this gating wave will be applied to the time gate 5, which will open for that tenth of a second. The gating wave generator 6 on the other hand will establish ten periods, each extending for a period of one-hundredth of a second and each having a time position with respect to the time period $y$ corresponding with the value of a quantity $y$. Only one of the gating periods established by the gating wave generator 6, however, will coincide with the gating wave established by the gating wave generator 4, since the gating waves established by the generator 6 occur once in each tenth second, and the time gate 5, or the gating wave established by the generator 4, extend for a time of only $\frac{1}{10}$ of a second. There is thus established a time extending for a period of $\frac{1}{100}$ of a second during which both the time gate 7 and the time gate 5 are opened simultaneously and this one-hundredth second interval represents the value of the quantity $y$ and the value of the quantity $z$ with respect to the time bases $y$ and $z$ respectively.

During the one second time base interval which we have been considering, pulse generator 1 has established an extremely short pulse having a time position with respect to the one hundredth second time base interval $x$ which represents the value of the quantity $x$; and during the time base of one second corresponding with the interval $z$ one hundred such pulses will be developed. However, only one of the one hundred such pulses will be enabled to pass through the time gates $y$ and $z$ during the time when they are simultaneously opened since the total such time equals the time of $\frac{1}{100}$ second. Accordingly, the pulse which is finally transmitted by the transmitter 9 will have a position with respect to the one hundredth second time interval representing the quantity $x$, with respect to the $\frac{1}{10}$ second time interval representing the quantity $y$, and with respect to the one second time interval representing the quantity $z$.

Reference is now made to Figure 2 of the drawings wherein is illustrated a simple, ungated receiver-indicator for receiving and indicating simultaneous time positions of pulses, with respect to three base time intervals $x$, $y$ and $z$. A receiver of the character of that illustrated in Figure 2 of the drawings may, accordingly, be employed in conjunction with a transmitter of the type of that illustrated in Figure 1 of the drawings, for indicating any pair of values of the quantities $x$, $y$ and $z$, as measured at the latter.

Pulses transmitted by the transmitter 9 may be received by a pulse receiver 10, which, at its output, is coupled with intensifier grids 11, 12 and 13 of cathode ray tube indicators 14, 15 and 16. The indicators 14, 15 and 16 may be provided with the normal elements (not shown) for generating and focusing a beam of electrons on a fluorescent screen, which may be of circular outline, and further the indicator 14 may be provided with vertical deflection electrodes 17, and with horizontal electrodes 18, the indicator 15 may be provided with vertical deflection electrodes 19 and with horizontal deflection electrodes 20; and the indicator 16 may be provided with vertical deflection electrodes 21 and with horizontal deflection electrodes 22.

The indicator 14 is intended to present a display of values of $x$ versus $y$, in rectangular coordinates. Accordingly to the horizontal electrodes 18 of the indicator 14 may be coupled the output of a sawtooth voltage generator 23, which is synchronized from an $x$ time base generator 1, identical with, and identically synchronized and phased with, the $x$ time base generator 1 of Figure 1.

Since the indicator 15 is intended to provide a display of values of $x$ versus $z$, in rectangular coordinates, the output of the sawtooth voltage generator 23 is likewise applied to horizontal plates 20 of indicator 15.

A sawtooth voltage generator 24 is further provided, which is coupled with vertical plates 17 of indicator 14, and synchronized from a $y$ time base generator 2. Since the indicator 16 is intended to provide a display of values of $y$ versus $z$, in rectangular coordinates, the output of the sawtooth generator 24 is applied to horizontal electrodes 22 of indicator 16.

A further sawtooth voltage generator 25 is provided, which is synchronized from the $z$ time base generator 3, and output voltage from which is applied to the vertical deflection electrodes 19 and 21 of indicators 15 and 16, respectively.

Figure 17:
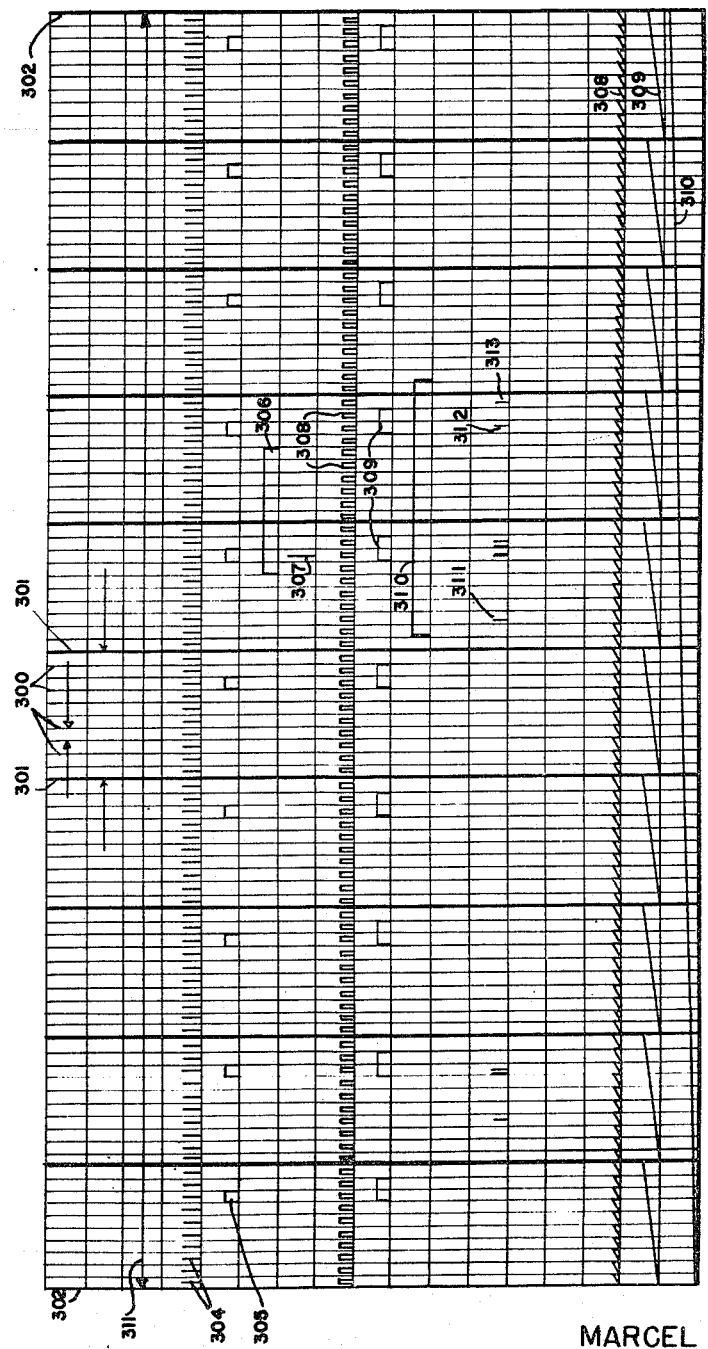
Figure 17 is a timing diagram, useful in explaining the functioning of the various embodiments of the present invention.

Referring now to Figure 17 of the drawings, for a timing diagram by reference to which the operation of the system comprising the transmitter of Figure 1 and the receiver of Figure 2 may be explained, the time base interval $x$ is defined by the distance between vertical lines 300, the time base interval $y$ by the distance between lines 301, and the time base $z$ by the distance between lines 302. It will be evident by reference to Figure 17 that the ratio between time base intervals $y$ and $x$, and between time base intervals $z$ and $y$, is 10:1; and that accordingly the interval between time base intervals $z$ and $x$ is 100:1, this ratio being, as has been explained hereinbefore, arbitrarily chosen, and not inherent in the system.

The short vertical lines 304 represent pulses, as generated by the $x$ pulse generator 8, and have a time position with respect to the $x$ time base intervals determined by the quantity $x$.

The recurrent square waves 305 represent $y$ gating waves, generated by generator 6, and which, with respect to the time bases $y$ have time positions determined by the value of the $y$ quantity.

The square waves 306 represent $z$ gating waves, generated by generator 4, and which, with respect to the time base interval $z$, have time positions determined by the value of the quantity $z$.

While, in Figure 17, $y$ and $z$ gating waves 305 and 306 are ilustrated as commencing each at the commencement of an $x$ time interval, it will be realized that the actual point of commencement is, in general, fortuitous.

Since the time extent of the $y$ gating wave 305 is precisely equal to the duration of the $x$ time base, and since the time duration of the $z$ gating wave 306 is precisely equal to the $y$ time base, only one of each one hundred $x$ pulses 304 coincides in time position with one of the $y$ time gating waves and simultaneously with the time range of the $z$ gating wave. That single pulse is identified by the reference numeral 307 and represents then, by its time position with respect to time base $x$ the quantity $x$, with respect to time base $y$, the quantity $y$, and with respect to the time base $z$, the quantity $z$, and is the pulse transmitted by transmitter 9.

It is true that a margin of error is introduced into the system by the fact that it is the center points of the gating waves $y$ and $z$ which truly represent the values of the quantities $y$ and $z$, while the pulse 307 may occur fortuitously with respect to the gating waves $y$ and $z$. The accuracy which is obtainable may be increased quite readily, however, by the simple expedient of increasing the ratios between the quantities $y$ and $x$ and $z$ and $y$, until a ratio is reached which is adequate for any particular application of the system.

The sawtooth waves 308, 309 and 310 represent the outputs of the sawtooth voltage generators 23, 24 and 25, respectively, and hence determine the positions of the cathode ray beams of the various indicators, 14, 15 and 16.

The lateral position of the beams of indicators 14 and 15 at the time of the occurrence and the reception, of pulse 307 indicates accordingly the time position of the pulse with respect to the $x$ time base interval.

The vertical position of the beam of the indicator 14, and the lateral position of the beam of indicator 16, at this same time, represents the time position of the pulse 307 with respect to the $y$ time base interval, and hence the quantity $y$.

Likewise, the vertical position of the cathode ray beam of indicators 15 and 16, at the time of reception of the pulse 307, controlled by the sawtooth voltage 5, represents the value of the quantity $z$, as measured at the transmitter.

Since the cathode ray beams are intensified in response to reception of the pulse 307 by receiver 10, and since the intensification of the beam creates a visible spot on the face of the indicator, it will be clear that the face of the indicator 14 will provide a plot of values of $x$ versus $y$, in a rectangular coordinate system, utilizing as coordinates the time bases $x$ and $y$; that on the face of the indicator 15 will be provided a plot of values of $y$ versus $z$, in rectangular coordinates, utilizing the time bases $x$ and $z$ as coordinates; and that on the face of the indicator 16 will be provided a plot of values of $y$ versus $z$, in rectangular coordinates, utilizing the time bases $y$ and $z$, as the coordinates.

The receiver of Figure 2 obviously will receive all pulses transmitted by the transmitter 9, and in the event that transmissions are provided from a plurality of such transmitters will provide indications representative of the time positions of all such signals simultaneously.

It is, however, one of the great advantages of the present system to enable time gating of received pulses, thereby permitting only indications of the positions of pulses having desired ranges of values within any one or more of the three basic time intervals $x$, $y$ and $z$. Description of several time gated triple synchrometric receiving systems is provided hereinafter, one simple form of such a system being described by reference to Figure 3 of the accompanying drawings, wherein the receiving system is illustrated as combined with a transmitter, of the type of that disclosed in Figure 1 of the drawings.

Reference is now made to Figure 3 of the accompanying drawings, wherein is illustrated in functional block diagram a triple synchrometric receiving system which is self gated, that is, wherein the gates are established by values of measured quantities $x$, $y$, and $z$, as measured at the receiver, to admit pulses transmitted from remote transmitters having time positions within each of the basic time intervals of the system which are adjacent to the time positions corresponding with the values of the quantities as measured at the receiver. The value of a self gated triple synchrometric system may best be illustrated by reference to the application of the system to one of its uses, and accordingly reference is made specifically to its use in connection with air navigation or traffic control systems. In connection with such use the quantity $x$ may represent bearing with respect to a fixed geographic location, the quantity $y$ may represent range with respect to that same location, and the quantity $z$ may represent altitude. In such case a number of aircraft equipped in accordance with the invention may be transmitting simultaneously pulses representative of their positions in all three co-ordinates. Any one of the aircraft equipped in accordance with the invention may desire to receive indications only from aircraft having position in respect to bearing, range and altitude simultaneously which are adjacent to its own position. This the receiving station is enabled to do by use of the receiving system of Figure 3, which is self gated, that is, gated in accordance with the position of the receiving station.

Referring now specifically to Figure 3 of the drawings, there is illustrated time base generators $x$, $y$ and $z$, identified by the reference numerals 1, 2 and 3, respectively, which may be in all respects identical with the time base generators 1, 2 and 3 of Figure 1. Synchronized by the outputs of the time base generators 1, 2 and 3 respectively may be receiver gating wave generators 30, 31 and 32, respectively, which may be of the same nature as the gating wave generators 8, 6 and 4 of Figure 1 except in respect to the duration of the gates provided thereby. In the transmitter of Figure 1 the gates provided within the longer base time interval were required to be of specific duration; so that the $z$ gating wave generator 4 was required to establish a gating wave extending for the duration of the base time period $y$, and the $y$ gating wave generator 6 was required to establish a gating wave having a duration equal to the base time interval $x$. This was required in order that ultimately only one of the pulses provided by the pulse generator 8 should be transmitted by the transmitter 9. In that portion of the system of Figure 3, which is devoted to reception, on the other hand, no such requirements exist and while the time position of the receiver gating wave supplied by the gating wave generators 30, 31 and 32 respectively are determined by the quantities $x$, $y$ and $z$ respectively, the durations of these gating waves may be of any desired extent and the gating time established for any of the channels $x$, $y$ and $z$ may be independent of the base time intervals $x$, $y$ and $z$, respectively. The gating waves established by the generators 30, 31 and 32 may be applied to receiver time gates 33, 34 and 35, respectively, which correspondingly establish receiver time gates in respect to the quantities $x$, $y$ and $z$. A pulse receiver 10 is provided, which receives pulses transmitted from one or more stations of the character of that disclosed in Figure 1, supplying these pulses after detection, to the time gate 33. Pulses passing through the time gate 33 are applied to the input of the time gate 37. Pulses passing through the time gate 34 are applied to the time gate 35 and pulses passing through the time gate 35 are applied to a series of indicators and recorders hereinafter to be described. Any pulse received by the receiver 10, accordingly, is applied to the indicators and recorders only if the pulse has a time position with respect to each of the time base intervals $x$, $y$ and $z$ which corresponds with the open settings of the time gates 33, 34 and 35 respectively. Should the time position of the received pulse be different with respect to any one of the time bases it will not pass through all the time gates, and consequently will not be indicated or recorded.

In the application of my system to air navigation, for example, let us assume base time intervals of one-hundredth, one-tenth and one second respectively for the time base generators $x$, $y$ and $z$, respectively; and further that the quantity $x$, represents bearing, the quantity $y$, range and the quantity $z$, altitude; and still further that the quantity $x$ corresponds with 360° of bearing, the quantity $y$ to 100 miles of range, and the quantity $z$ to ten thousand feet of altitude, at maximum values. Let us assume further that the receiving aircraft is flying at an altitude of 5,000 feet, a range of 40 miles and a bearing of 180°, and that each of the time gates extends for a time period equal to 20% of the corresponding basic time interval. The time gate 35 then would be open for a time period extending from four-tenths of a second to six-tenths of a second after the beginning of the time base period $z$.

Only those pulses received by the pulse receiver 10 will be able to pass through the time gate 35 which originate aboard aircraft flying within the range of altitudes 4,000 to 6,000 feet, since only such aircraft transmit pulses during the required time period. Prior to arriving at the time gate 35, however, these pulses must have passed the time gate 34. Since our assumed range was 40 miles for the receiving aircraft the time gate $y$ will be open during each tenth of a second from a time beginning at three tenths of the one second time base interval to a time extending to five tenths of that time interval. Accordingly, only aircraft flying at a range from 30 to 50 miles will provide pulses which may pass through the time gate 37, and of these pulses only those which simultaneously originated aboard craft flying between the altitudes of 4,000 and 6,000 feet will be able to pass through the time gate 35 and be impressed upon the indicators and recorders of the system, since only such aircraft will transmit during the appropriate time interval.

In like manner, still a further selection is made in accordance with bearing, by the time gate 33. Since the latter generates a 20% time gate, only aircraft flying within a bearing plus and minus 36 degrees from due south will be enabled to generate pulses timed to pass through the time gate 33. Those pulses which do pass through gate 33, by virtue of the fact that they originate at the proper bearing, will only be able to pass through the time gate 34 and 35 if they also originate at proper ranges and altitudes, as has been explained heretofore.

The indicators of the present system may be of two distinct types. For one type, I utilize facsimile type recorders, each of which is synchronized with a different one of the basic time intervals of the system, and to the recording platens of all these facsimile receivers I apply the output of the $z$ time gate 35, in parallel. Accordingly, on the record receiving surfaces of the facsimile type recorders are recorded time records of the values of all received quantities which are accepted by the time gates. As a further type of indication I utilize cathode ray tube oscilloscopes. I apply to one of a pair of mutually perpendicular deflecting elements of the tubes a sweep voltage synchronized with one of the basic time intervals $x$, $y$ and $z$, and to the other deflecting elements, another sweep voltage synchronized with another of said time bases. Accordingly, on the faces of these oscilloscopes is indicated the relationship between the $x$ and $y$ quantity, on the second of which may be indicated the relationship between the quantities $x$ and $z$, and on the third of which may be indicated the relationship between the quantities $y$ and $z$. In terms of the navigational quantities bearing, range and elevation the first indicator provides plots of positions of aircraft in terms of bearing against range, the second provides plots of positions of aircraft in terms of bearing against altitude, and the third provides plots of positions of aircraft in terms of range against altitude.

For the purpose of providing the above mentioned indications, I provide three sweep generators 23, 24 and 25 which are synchronized respectively by the time base generators 1, 2 and 3. Each of the sweep generators 17, 20 and 24 provides at its output a sawtooth voltage which commences at the time of the commencement of the basic time interval associated therewith and terminates with the termination of that time interval.

Signals derived from the output of the $z$ receiver time gate 35 are applied to intensifying grids of the cathode ray tubes to produce dots having co-ordinates determined by the values of the quantities represented. Denoting by the numeral 14 the cathode ray tube which displays a plot of values of $x$ against $y$, the output of the sweep generator 23 is applied to the horizontal plate 18 of the indicator 14 and the output of the sweep generator 24 is applied to the vertical plate 17 of the indicator 14. utilizing a basic time interval of one hundredth second for the sweep generator 23 and one-tenth second for the sweep generator 24. The beam of the cathode ray tube indicator 14 traces through the vertical sweep once in each tenth of a second and during that tenth of a second traces through ten horizontal sweeps, thus scanning substantially the entire face of the cathode ray tube indicator.

Turning now to the cathode ray tube indicator 15 the output of the sweep generator 23 is applied to the horizontal plate 20 and the output of the sweep generator 25 to the vertical plate 19, providing a display on the face of the indicator 15 of the relation of the quantity $x$ to the quantity $z$. Likewise a plot of $y$ against $z$ is provided on the face of the indicator 16 by applying to the horizontal plate 22 the output of the sweep generator 24 and by applying to the vertical plate 21 of the indicator 16 the output of the sweep generator 25. The indicators 14, 15 and 16 are provided respectively with intensifier grids 11, 12 and 13, to which are applied in parallel output signals derived from the timing gate 35. Any pulse, then, which is received by the pulse receiver 10 and which passes through the time gates 33, 34 and 35 is applied to the intensifier grids 11, 12 and 13, provides on the faces of the indicators 14, 15 and 16 a plot of the time values of the pulse with respect to two of the basic time intervals of the system, simultaneously on each of the indicators.

A direct parallel connection of the grids 11, 12 and 13 to the output of the time gate 35 is possible in a simplified form of the present receiver. It is desired, however, in the system specifically illustrated in Figure 3, to provide on the faces of the indicator 14, 15 and 16 indications of the local position of the receiver for comparison with the plot of received pulses. It is, accordingly, necessary to isolate the grids 11, 12 and 13 from each other and to accomplish this isolation the output of the time gate 35 is applied to the grid 13 over an isolating stage 60, and to the grid 12 over a further isolating stage 61 which is connected with its input in parallel with the input of the amplifier 60. Likewise signal is applied to the grid 11 over an isolating stage 62 which is connected with its input in parallel with the input of the stage 60 and 61. The use of such isolating stages enables application to the grids 11, 12 and 13 of signals necessary for marking the position of the local receiver, and which distinct indications are not identical on the faces of all the indicators and do not occur at identical times on the faces of all the indicators 14, 15 and 16. For the purpose of providing local marker signals a pulse generator $x$ identified by the reference numeral 8 is connected at the output of $y$ time base generator 1. The structure of the pulse generator 8 is similar to that of the gating wave generator 30 with one exception, namely that the pulse generator 8 generates an extremely short pulse. Just as in the case of the generator 30, however, the pulse generated by the generator 8 has its center point precisely at the value determined by the quantity $x$. A further $y$ pulse generator 6 is connected with its input to the output of the $y$ time base generator 2, and serves to generate a pulse having a duration equal to the $x$ time base, and having a mean time position corresponding with the value of the quantity $y$. Still a further pulse generator 4 is connected with its input to the output of the $z$ time base generator 3 and is utilized to establish a pulse having a time duration equal to that of the time base $y$ and a mean position corresponding with the value of the quantity $z$.

The output of the pulse generator 8 is applied over an isolating stage 63 to the grid 11 of the indicator 14 and is likewise applied over an isolating stage 64 to the grid 12 of the indicator 15, the stage 64 being connected with its input in parallel with the input of the stage 63 to prevent interaction between the grids 11 and 12. The output of the pulse generator 8 accordingly provides intensified spots on the face of the cathode ray tubes 14 and 15 at lateral positions corresponding with the values of $x$ at the local receiver. Since the pulses produced by the pulser 8 are ungated these intensified spots appear at all vertical positions on the faces of the indicators 14 and 15 and effectively form a vertical line having a lateral position corresponding with the local value of the quantity $x$. The output of the pulse generator 7 is applied in parallel over isolating stages 65 and 66 directly to the grids 11 and 13 of the indicators 14 and 16 respectively. Considering the indicator 14 the pulse provided by the pulse generator 7 is applied at a time in the $y$ sweep corresponding with the value of the $y$ quantity, and since the pulse generated by the generator 7 extends for a time equal to one horizontal sweep of the beam of the indicator 14 a horizontal line is produced which extends entirely across the face of the indicator 14 at a vertical position determined by the value locally of the quantity $y$.

Since the output of the generator 7 is applied to the grid 13 of the indicator 16 at times identical with the times of application of that same signal to the grid 11 of the indicator 14 there is produced on the face of the indicator 16 a vertical line having a lateral position corresponding with the value of the quantity $y$ at the local receiver.

The output of the pulse generator 4 is applied to the intensifier grid 12 of the indicator 15 over an isolating amplifier 67 and provides a signal having a duration adequate to produce a horizontal trace extending entirely across the face of the indicator 15, this pulse occurring at a time such that the vertical position of the trace corresponds with the value of the quantity $z$. Accordingly, the intersection of the horizontal and vertical traces present the position of the local receiver in respect to a pair of coordinates determined by the values $x$ and $z$.

The output of the generator 7 having likewise been applied to the grid 13 of the indicator 16, over isolating stage 66, during the horizontal sweep of the beam of the indicator 16 which is determined by the value of the quantity $z$ at the local station, a vertical line is produced on the face of the indicator 16 having a lateral position corresponding with the value of the quantity $y$. The output of the generator 4 being applied over an isolating stage 68 to the grid 13 of the indicator 16, and having a duration adequate to extend across one entire lateral trace on the face of the indicator 16, and occurring at a time within the time base $z$ determined by the value of the quantity $z$, provides a laterally extending line having a vertical position corresponding with the local value of the quantity $z$. Accordingly, there is provided on the face of the indicator 16 a pair of mutually perpendicular intersecting lines the points of intersection of which correspond with the local values $y$ and $z$.

Pulses received by the pulse receiver 10, and which pass through all the gates 33, 34 and 35, in succession, may be applied to a series of facsimile recorders 80, 81 and 82 which are of conventional character generally, the facsimile recorder 80 being synchronized from the time base generator 1, the facsimile recorder 81 being synchronized with respect to the time base 9, and the facsimile recorder 82 with respect to time base $z$. In this manner, the records produced on the record receiving surfaces associated with the facsimile recorder provide a continuous time record of the values of all received signals with respect to each of the time bases.

In order to delineate the area of the face of each indicator which is within the timing gates, I provide the local oscillator 83 which may be of the sine wave type, and which may produce a signal output at a frequency far greater than the highest video frequency otherwise involved in the system. For example, the sine wave oscillator may oscillate at a frequency of 10,000 cycles per second. The output of the sine wave oscillator 83 is applied to the input of the time gate 33 in parallel with the output of the pulse receiver 10. The amplitude of the output of the sine wave oscillator 83 may be considerably smaller than that of pulses provided by pulse receiver 10, so that modulation of the grids 11, 12 and 13 by the output of the sine wave oscillator 83 results in a slight brightening of the faces of the indicators 14, 15 and 16 and a slight darkening of the record receiving surfaces of the recorders 80, 81 and 82. Since the output of the sine wave oscillator 83 may be applied to the indicators 14, 15 and 16 only during such times as all three gates 39, 37 and 35 are opened simultaneously there will be produced on the faces of the indicators 14, 15 and 16 areas of a dimly illuminated character, the boundaries of the areas being determined by the time boundaries of the time gates 33, 34 and 35.

Figure 4:
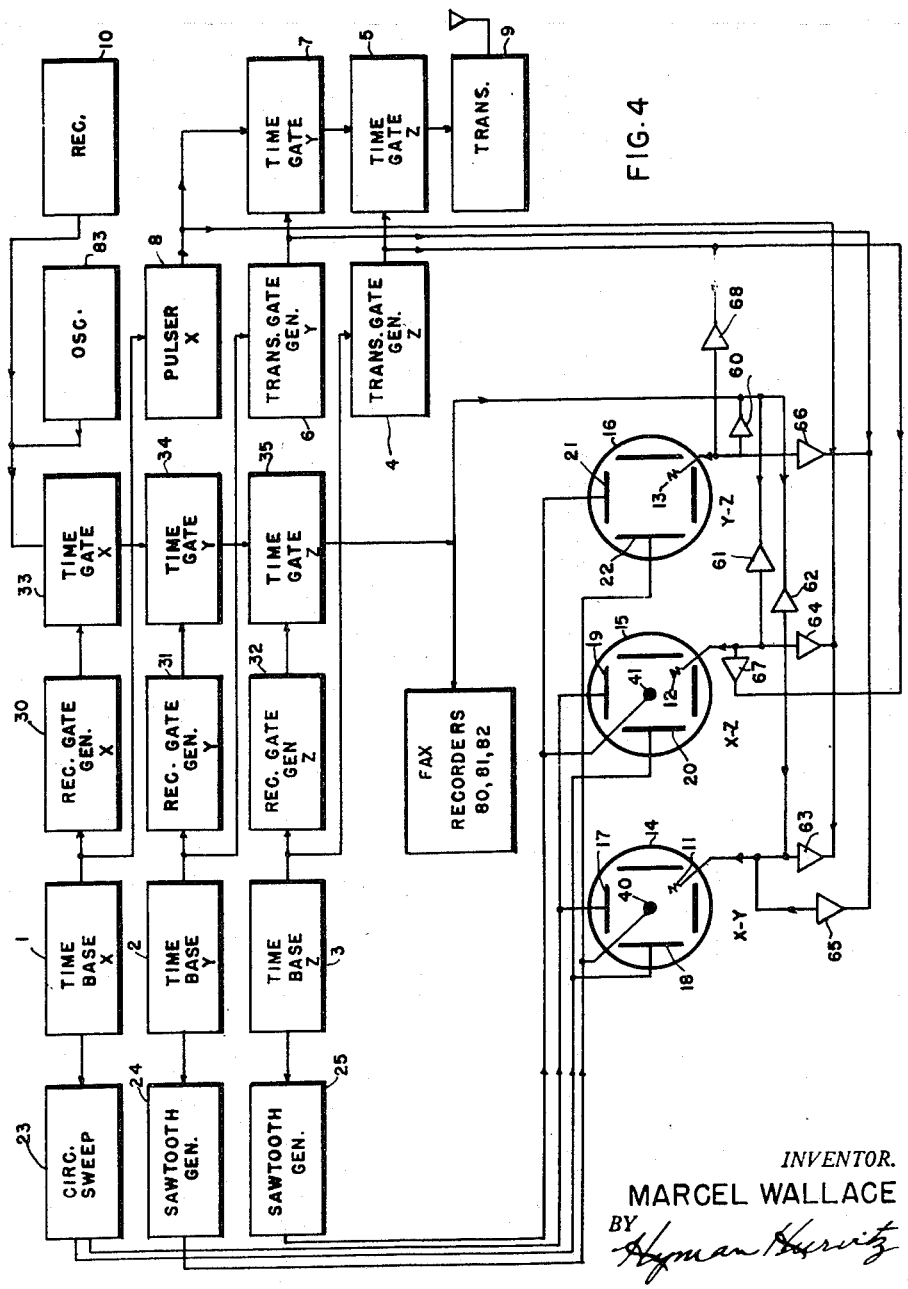
Figure 4 is a functional block diagram of a variant of the system of Figure 3.

Reference is now made to Figure 4 of the drawings wherein is illustrated in functional block diagram a receiving system utilizing time gating and local receiver position indicating as in Figure 3, and which is generally similar to the embodiment of Figure 3, being different therefrom only in this respect, that the traces produced on the faces of the indicators 14 and 15, which display a plot of the relation of values of $x$ to $y$ and $x$ to $z$, respectively, are in the form of polar plots. The indications provided on the face of the indicator 46 and representing the relation of $y$ to $z$ on the other hand are rectangular, as in the case of Figure 3. The value of polar plots for representing the relationship between $x$ and $y$ and the quantities $x$ and $z$ will be evident when it is considered that the quantity $x$ may represent bearing of an aircraft with respect to a predetermined location, that $y$ may represent range of that aircraft with respect to that location, and that $z$ may represent altitude. The plots provided in the system of Figure 4, accordingly, are of the plan position type, for showing bearing against range and bearing against altitude, and are of the rectangular type for showing a plot of range against altitude on the face of the indicator 46.

The systems of Figures 3 and 4 may be analogous or identical, except in respect to production and application of scanning voltages to the cathode ray tube indicators. In this respect, in Figure 4 of the drawings, the $x$ time base generator 1 synchronizes and phases a circular sweep generator 23, the output of which is applied to the mutually perpendicular deflecting electrodes 17, 18 and 19, 20 of cathode ray tube indicators 14 and 15, to cause identical circular sweeps of the beams of the indicators at a rate corresponding with the $x$ time base repetition rate.

The output of the sawtooth generator 24 is then applied to a radial deflecting electrode 40 of indicator 14 and the output of sawtooth generator 25 to radial deflecting electrode 41 of indicator 15, to effect radial deflection at the repetition rate of the $y$ and $z$ time base generators, respectively. The beams of the indicator accordingly provide a spiral scan, the convolutions of which occur at the $x$ rate, and are separated radially by spacings determined by the ratio between the $y$ and $x$ time base intervals.

By the addition of relatively few elements to the systems of Figures 3 and 4, considered as receiving system, the latter may be adapted to transmit triple synchrometric pulses, at time positions with respect to each of the time base periods $x$, $y$ and $z$, which represent the local values of the quantities $x$, $y$ and $z$ respectively.

In the application of the system to navigational systems, traffic control systems, and radio aids to navigation, each of a plurality of craft equipped in accordance with the system is enabled not only to receive signals corresponding with or adjacent to navigational parameters pertaining to the craft itself, but is also enabled to transmit signals, which, when interpreted aboard remote craft convey to these latter the three parameters, representing the bearing, range and altitude of the transmitting craft.

For this purpose, it is necessary only to provide in the systems of Figures 3 and 4 a transmitter and a pair of gated amplifiers, connected in cascade and leading to the input of a transmitter. The transmitter itself is identified by the reference numeral 9, to correspond with the notation of Figure 1. The cascaded gated amplifiers are denoted by the numerals 7 and 5 respectively, since they correspond with the time gates 7 and 5 of Figure 1, which are identified by these same numerals. The input to the first gated amplifier 7 is derived from the output of the $x$ pulse generator 8, in Figure 3, and which corresponds with the pulse generator 8 of Figure 1. The gated amplifiers 7 and 5 are supplied with gating signals derived from the $y$ and $z$ gating pulse generators 6 and 4, in Figures 3 and 4, and which serve to turn on the gated amplifiers 7 and 5 for the duration of the pulses provided by the generators respectively. Pulse generators 6 and 4 of Figures 3 and 4, accordingly, find their precise parallel in the gating wave generators 6 and 4 of Figure 1.

Figure 5:
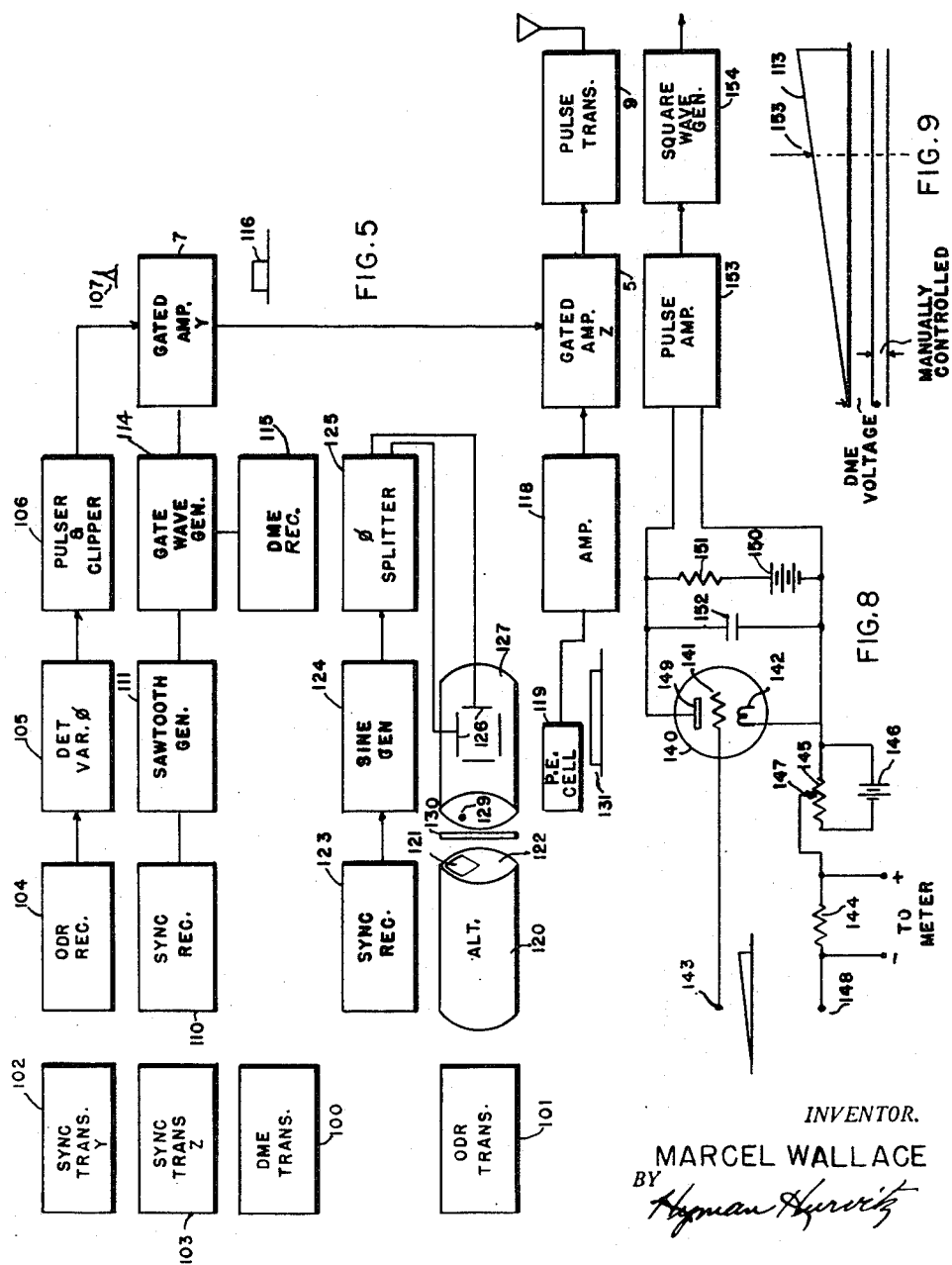
Figure 5 is a functional block diagram of a specific form of transmitter, generally arranged in accordance with the system of Figure 1.

The transmitter of Figure 1 is of quite generalized character, in that precise structure of the various elements of the transmitter are not illustrated or described in detail, to simplify presentation of the theory of the system. Attention is now directed to Figure 5 of the drawing wherein is illustrated a specific example of a transmitter arranged in accordance with the system of Figure 1.

In the system of Figure 5 use is made of the fact that under present regulations of the Civil Aeronautics Authority all aircraft will be equipped with omni-directional range or ODR transmitters, and all aircraft will be equipped with suitable receivers for receiving transmissions from the ODR transmitters. These transmitters are arranged to transmit signals modulated with two modulating signals. The first of these latter comprises an omni-directional 30 cycle modulation which has the same phase when received in any direction from the transmitter. The second of these signals represents a thirty cycle modulation which has a phase dependent upon the direction from which a signal is received, that is, a phase dependent upon the bearing of the receiving aircraft from the ODR or omni-directional range transmitter. In the normal use of ODR transmitting and receiving systems, the ODR receivers aboard the various aircraft receive the two thirty-cycle modulation signals and compare their phases in order to provide an indication of bearing from the ODR transmitter. In the embodiment of the present system, illustrated in Figure 5, wherein is shown a transmitter of triple synchrometric character, it is necessary to utilize only the thirty-cycle output of variable phase available at the output of ODR receivers aboard the aircraft, which, in the present system, may be utilized to generate pulses having time positions corresponding with the bearing of the receiving craft. These latter may then represent the $x$ quantity pulses in the system. Distance aboard the various aircraft may be determined by means of DME or distance measuring equipment, the character and function of which are well known in the art, and which involves broadly a pulsed radio transmitter and a pulse radio receiver, and circuits for measuring the time difference between transmission and reception of pulses. Range measurements by means of a DME transmitter are accomplished with respect to a DME transponder located at a predetermined location on the ground, which may be assumed for the purposes of the present invention to be at or adjacent to the ODR transmitter. Synchronization of that transmitting channel in the present system which serves to determine a gating time in accordance with the value of a $y$ quantity is accomplished by means of a remote synchronizing transmitter which transmits pulse signals to all the aircraft of the present system say at the rate of three pulses per second. These pulses when received aboard the various aircraft are utilized to start the rise of output of a sawtooth generator whose voltage is instantaneously compared at all times with the voltage output of a DME receiver and measuring equipment. Upon attainment of a suitable relation between the value of the sawtooth voltage and the output voltage of the DME measuring device, a pulse is generated which has a width suitable for application to a time gate. This latter wave may be utilized to gate open an amplifier, to the input of which are applied the pulses derived from the ODR transmitter, and permits one of the latter pulses to pass through the gated amplifier during each one-third of a second.

Altitude in the present system may be measured by means of an aneroid cell, although obviously any other type of suitable measuring device may be used. The aneroid cell is provided with a pointer having a width determined by the duration of the $y$ gating waves in the present system. The position of the pointer may be read by means of a flying spot generator, the flying spot being driven in a circular path by means of a split phase generator, which is synchronized by means of signals provided by a synchronizing receiver. The latter receives pulse signals from a ground station, which determine the $z$ time base intervals. For the sake of providing a concrete example, in connection with the embodiment of the invention illustrated in Figure 5 of the drawings, we may assume a $y$ time base interval of 1/3 second, a $z$ time base interval of 3 1/3 seconds, and an $x$ time base interval of 1/30 second. Accordingly, while the $x$ time base interval is 1/30 of a second, in the embodiment of Figure 5, the ratio between the intervals $y$ and $x$, and the $z$ and $y$ intervals, remains 10, as in the system of Figure 1.

The pointers of the altimeters may be arranged to be light reflective and to move across a black meter face so that the flying spot is reflected from the meter pointer, but not from the meter face. A photoelectric cell is arranged adjacent to the meter and picks up light reflected from the pointer, generating a current in response thereto. This latter current represents a gating wave which may be applied to a gated amplifier, corresponding with the $z$ time gating wave of Figure 1. During each time period $y$, ten pulses are passed through the gated amplifier corresponding with the time period $y$, and are applied to the input of the gated amplifier $z$. The gating wave generated by the photo-cell opens the latter amplifier for a period adequate to permit one of these pulses to pass through the gated amplifier $z$, during each of the longest or $z$ time intervals of the system. Those $x$ quantity pulses which pass through both the gated $y$ and $z$ amplifiers are applied to a transmitter and transmitted to remote aircraft of the system, where they may be translated into indications representative of the bearing, range and altitude of the transmitting aircraft.

Describing the system of Figure 5 in more detail, and referring now more specifically to Figure 5 of the drawings, the reference numeral 100 represents a DME transmitter located at any convenient location. The reference numeral 101 represents ODR transponder likewise located at or adjacent to the same location. The reference numerals 102 and 103 represent, respectively, ground located pulse transmitters for establishing the time base periods $y$ and $z$, by transmitting pulses at time intervals demarcating these time intervals, and specifically as time intervals for the transmitter 102 of one-third seconds and for the transmitter 103 of three and one-third seconds. While I have illustrated separate pulse transmitters 102 and 103, this is for the sake of simplification only, and it will be realized that suitable sync signals may be provided alternatively by suitably modulating the omni-directional transmissions from ODR transmitter 101.

Transmissions from the ODR transmitter 101 are received by the ODR receiver 104 aboard any one of the aircraft, Figure 5 being intended to be typical of a transmitter installation. The output of the ODR receiver is applied to a detector 105 which separates therefrom the 30 cycle modulation of variable phase. The latter is then applied to a pulser and clipper 106 which generates a pulse each time the 30 cycle modulating signal passes through zero. By reason of the fact that the 30 cycle signal passes through zero, first in one sense and then in another sense, during each cycle of the modulation, one of the generated pulses is positive and another is negative. The negative pulse is removed by the clipper, and the positive pulse, 107, is applied to the gated amplifier 7.

The sync signal receiver 110 receives sync pulse transmissions from the sync transmitter 102, and applies these pulses to a saw-tooth generator 111, which, in response, generates saw-tooth waves 113 having an initial point simultaneous with the pulses 112. The saw-tooth waves 113 are applied to gating wave generator 114, to which is also applied the voltage output of a DME receiver 115, the latter output comprising a voltage having a value determined by the range of the aircraft with respect to the DME transponder 100.

Upon attainment of a definite amplitude relation between the saw-tooth wave 113 and the output of the DME, the gating wave generator 114 establishes a gating wave 116, having a duration of one-thirtieth of a second and a time position at its central point corresponding with the range measurement provided by the DME 115. The wave 116 is applied to the gated amplifier 7, turning the latter on and permitting passage of one of each ten pulses 107 through the gated amplifier 7, the remaining nine pulses being blocked out. The transmitted pulse then has a time position with respect to the one-thirtieth second or $x$ base time interval which is determined by the bearing of the transmitting craft, and has a time position with respect to the $y$ interval, established by the transmission from the sync transmitter 102, having a time position determined by the reading or measurement established by the DME 115. The pulses 107 which pass through the gated amplifier 7 are then applied to the input of the gated amplifier 5, which is normally blocked. The gating signal for gating open the amplifier 5 is provided by a photoelectric cell amplifier 118, which is supplied with signals by a photo-cell 119, the latter being controlled in a manner now to be described.

The quantity $z$, which represents altitude in the presently described embodiment of the invention, is measured by means of aneroid cell 120, which may be of generally conventional character, but which departs from the conventional in that it has a pointer 121, which is strongly light reflecting, and a face 122 which is non-light reflecting. The pointer 121 occupies an angular section on the face 122 of the meter 120 which is determined by the gating wave requirements for the gated amplifier 117, in a manner which will appear as the description proceeds.

A sync receiver 123 is provided in connection with the $z$-channel of the transmitter of Figure 5, which receives signals from the sync signal transmitter 103 at time intervals of three and one-third seconds, corresponding with the $z$ time base intervals. These signals are utilized to establish sine wave oscillations, and to synchronize and control these latter to have a phase and a frequency which are determined by the time positions of the synchronized signals.

The output of the sine wave generator 124 is applied to a phase splitter 125, the phase split output of which is applied to the mutually perpendicular deflecting electrodes 126 of the cathode ray tube indicator 127. The tube 127 is supplied with the necessary elements for generating a beam of electrons and comprises a fluorescent screen. Application of phase split voltages to the deflecting electrodes 126 causes the beam to describe a circular path on the face of the indicator, and the fluorescent screen having an extremely short period of fluorescence a rotating spot of light 129 is provided which is synchronized in respect to its time positions with the synchronizing signals received by the sync receiver 123, and consequently with the $z$ time base interval. The spot of light 129 is focused on the face of the meter 120 by means of a lens system 130, and upon passage of the spot over the indicator pointer 121 light is reflected therefrom to the photo-cell 119. Upon passage of the spot across the face 122 of the meter 120, on the other hand, light is not reflected, since the face 122 is non-light reflecting, and, accordingly, no signal is generated in the photo-cell 119. The output of the photo-cell 119, therefore, consists of a square wave 131 having a duration determined by the angular sector occupied by the pointer 121, and having a time position determined by the reading of the pointer 121, this time position and duration being established with respect to the $z$ time interval determined by the synchronizing transmissions from the transmitter 103, which take place at a frequency of one pulse for each three and one-third seconds. The angular dimensions of the pointer 121 are selected to provide a pulse having a time duration of one-third of a second, that is a time duration corresponding with the time duration of the time base interval $y$. As has been stated hereinbefore the output of the photo-cell 119 is applied as a gating wave to the gated amplifier 5 turning the latter on for a time of one-third of a second during each three and one-third seconds time intervals, and permitting passage of a selected one only of each ten pulses 107, which are passed by the gated amplifier 7. The time position of the pulse which is transmitted accordingly has a time position with respect to the long time interval $z$ which represents the reading of the altimeter 120, and has a time position with respect to the time bases $x$ and $y$, as has already been explained, which correspond with the bearing and range of the craft, as determined by the ODR receiver 104, and by the DME 115. This pulse is applied to transmitter 9 for triggering the latter, as in Figure 1.

It should be realized that the specific manner of generating the gating waves 116 and 131 in the embodiment of the invention illustrated in Figure 5 of the drawings are for purposes of example only, and that various other methods of generating the gating waves may be employed.

Reference is made to Figure 8 of the drawings for the illustration of the specific character of circuits which may be employed as the gating wave generator 114, of Figure 5. A saw-tooth voltage, as provided by the saw-tooth generator 117, for example, may be applied between the control grid 141 and the cathode 142 of a thyratron tube 140, via terminals 143 and 148. Intermediate the input terminal 143 and the cathode 142 may be inserted a resistance 144 and a resistance 145. The resistance 144 may be supplied with terminals thereacross to which is applied the voltage provided by the DME range measuring equipment 115, in such sense as to render the cathode 142 positive with respect to the grid 141. Across the resistance 145 may be connected a biasing source 146, establishing a voltage drop across the resistance 145. The positive end of the resistance 145 is connected directly to the cathode 142 and a variable tap is taken from the resistance 145 which is connected to the positive end of the resistance 144. In this manner the grid 141, of the tube 140 may be biased negatively in two steps, one of which is manually selectable to correspond with the position of the tap 147 and the other of which is determined by the value of the measurement established by the DME 115. The saw-tooth wave 113 is applied to the grid 141 in such sense as to render the grid 141 more positive as the saw-tooth signal increases in value. The thyratron tube 140 may be supplied with a plate 149, to which is applied positive voltage, derived from a source 150, over a load resistance 151. The design constants of the thyratron 140 may be such that upon application of zero voltage between the grid 141 and the cathode 142 conduction takes place, but upon application thereto of any voltage less than zero conduction does not take place.

As is well known, the character of thyratron tubes is such that once conduction has been started in such a tube it may be terminated only by removal of plate voltage. Accordingly, there is connected between the cathode 142 and the plate 149 of the thyratron 140 a condenser 152, which is normally charged from the battery 150 over the resistance 151, and which, while the tube 140 is non-conducting is accordingly at the potential of the voltage source 150. When the tube 140 fires the condenser 152 discharges through the tube, the voltage across the condenser thereupon decreasing to an extremely small value. Since the voltage across the condenser corresponds with the voltage across the thyratron 140, the thyratron immediately stops conducting, and the condenser commences to recharge through the resistance 151, in response to voltage from the source 150. Discharge of the tube 140 occurs at a time in the buildup of the sawtooth voltage 113 when the latter precisely overbalances the two voltages provided across the resistance 144, and by the tap 147, so that firing of the tube 146 occurs at a time position determined by the range of the aircraft, this time position being, however, subject to being set back to any desired extent by adjusting the tap 147.

Referring specifically to Figure 9 of the drawing, there is shown the sawtooth voltage 113, extending in a positive sense, the DME or range representative voltage available across to resistance 144, and the manually-controllable voltage provided by the tap 147, extending in a negative sense, and in series. As the voltage 113 builds up, a point is finally reached, as at 153, where the positive voltage of the sawtooth signal 113 precisely overbalances the two negative voltages, in series, and the thyratron fires. While the tap 147 may be set to provide any desired time of advance in the time of firing of the tube 140, for the purpose of enabling proper functioning of the system of Figure 5, this time advance is set at precisely one-half the value of the desired duration of the time gate 116, so that, while in the absence of the voltage provided by the tap 147 the tube 140 would fire precisely centrally of the desired time gate 116, by virtue of the additional negative voltage provided by the tap 147 the firing occurs precisely at the commencement of the time gate 116. The voltage present across the condenser 152, or alternatively across the load resistance 151 and the voltage source 150 is amplified by a voltage amplifier 153 which provides, then, a single pulse having a time position within the time base period $y$ which occurs at the commencement of the desired gating wave 116. This pulse is applied to synchronize square wave generator 154, which generates a wave 116 having the desired time duration, and which is applied to the gated amplifier 107 to open the latter. The time constant of the resistance 151 and the condenser 152 are selected to have a sufficiently great value to obviate the possibility of firing of the tube 140 twice in any one base time period $y$.

Mechanism which is utilized to establish the $z$ time gate in the embodiment of the invention illustrated in Figure 5, may obviously comprise a circuit of the type that is illustrated in Figure 8, provided only that the altimeter 120 provides an output voltage proportional to altitude. Correspondingly, the $y$ time gate may be generated by means of flying spot equipment similar to that used in generating the $z$ time gate in Figure 5.

Still further, I may utilize, to generate the $y$ or the $z$ gate, or both, mechanism of a type illustrated in Figures 13, 14 and 15 of the drawings. In the latter system the synchronizing receivers are utilized to control the framing and speed of rotation of a synchronizing motor which is utilized to rotate a disc having therein an aperture, the latter having a radial opening which is of an angular extent determined by the duration of the desired gate. The meter, whether an altimeter or a DME range indicator, is utilized to position a further disc having therein a radial aperture of narrow angular dimension. The two discs are arranged in parallel planes, adjacent to one another. On one side of the discs is provided a source of illumination and on the other side a photocell, light passing from the source to the cell when, and only when, the two apertures are aligned. Accordingly, the voltage output of the photocell will correspond with a square wave having a duration determined by the angular extent of the apertures, and having a time position determined by the position of the meter controlled disc, and consequently by the reading of the meter.

Referring now specifically to Figures 13, 14 and 15 of the drawing, the reference numeral 150 represents a motor which may be synchronized from a sync receiver of the type illustrated in Figure 5, and there identified by the reference numerals 110 and 123. Motors 160 may be assumed to be operating at each of the stations of the present system in precisely the same phase and at precisely the same speed, being synchronized from the same synchronizing transmitters, 102 or 103, as the case may be, and in accordance with the use to which the specific gating wave generator may be applied. Secured to the shaft of the motor 160 is a disc 161, shown in side elevation in Figure 13, and in front elevation in Figure 14. Disc 161 may be seen to be supplied with an aperture 162 subtending an arc determined by the gating wave requirements of the system. For the transmitter of Figure 5, wherein the ratio of time duration between the basic time intervals $x$, $y$ and $z$ is 10, the arc subtended by the aperture 162 must be $\frac{1}{10}$th of the total circumference of disc 161, or a total angle of 36 degrees. The radial position and extent of the slot 162 is relatively immaterial. A further disc 163 is provided which is arranged in a plane parallel to and adjacent to the plane of the disc 161, and which contains the narrow radial slot 165. The disc 163 is positioned by a meter 164. For the application of my invention to navigational systems the meter 164 may be an altimeter, or the meter 164 may be a distance measuring meter, depending upon whether it is desired to generate the $y$ or the $z$ time gate. Disc 163 is provided with a radial slot 165 of narrow dimensions which is positioned to intersect the slot 162 of the disc 161. The slot 165 accordingly corresponds with a meter pointer in its angular position, thus representing the reading of the meter 164. On one side of the disc 161 is placed a stationary source of illumination 166 which is arranged to transmit light to the aperture 162 when the aperture 162 is aligned with the source of light 166. To prevent escape of light from the source in undesired directions its light is focused by means of a lens 167 in a narrow beam directed toward the slot 162 of the disc 161. Accordingly as the disc 161 rotates and as the slot 162 aligns with the slot 165 in the disc 163 light passes through both discs. This light is caused to impinge upon a frustro conical mirror 166 which directs light, falling thereon in parallel beams, towards a single focal point, regardless of the angular position of the light beam. At this focus is placed a photocell 167 the output voltage of which corresponds with the desired gating waves. Unless the slots 162 and 165 are aligned no light falls on the cell and there is consequently no output. During the time of alignment of the slots 162 and 165, regardless of the then position of the disc 163, output is produced by the cell 167. This output thus has a time position corresponding with the reading of the meter 164 and has a duration corresponding with the extent of the slot 162.

It is realized that various other types of gating wave generators may be envisioned and provided by those skilled in the art. The present invention, however, does not concern itself primarily with details of gating wave generators but rather with an overall system of air aids to navigation and traffic control, and the specific types of gating wave generators which are illustrated in connection with the description of the various embodiments of the invention, as well as the gating wave generator of Figure 13, may be considered as presented for the sake of example only, and not by way of limitation on the scope of the invention.

Figure 6:
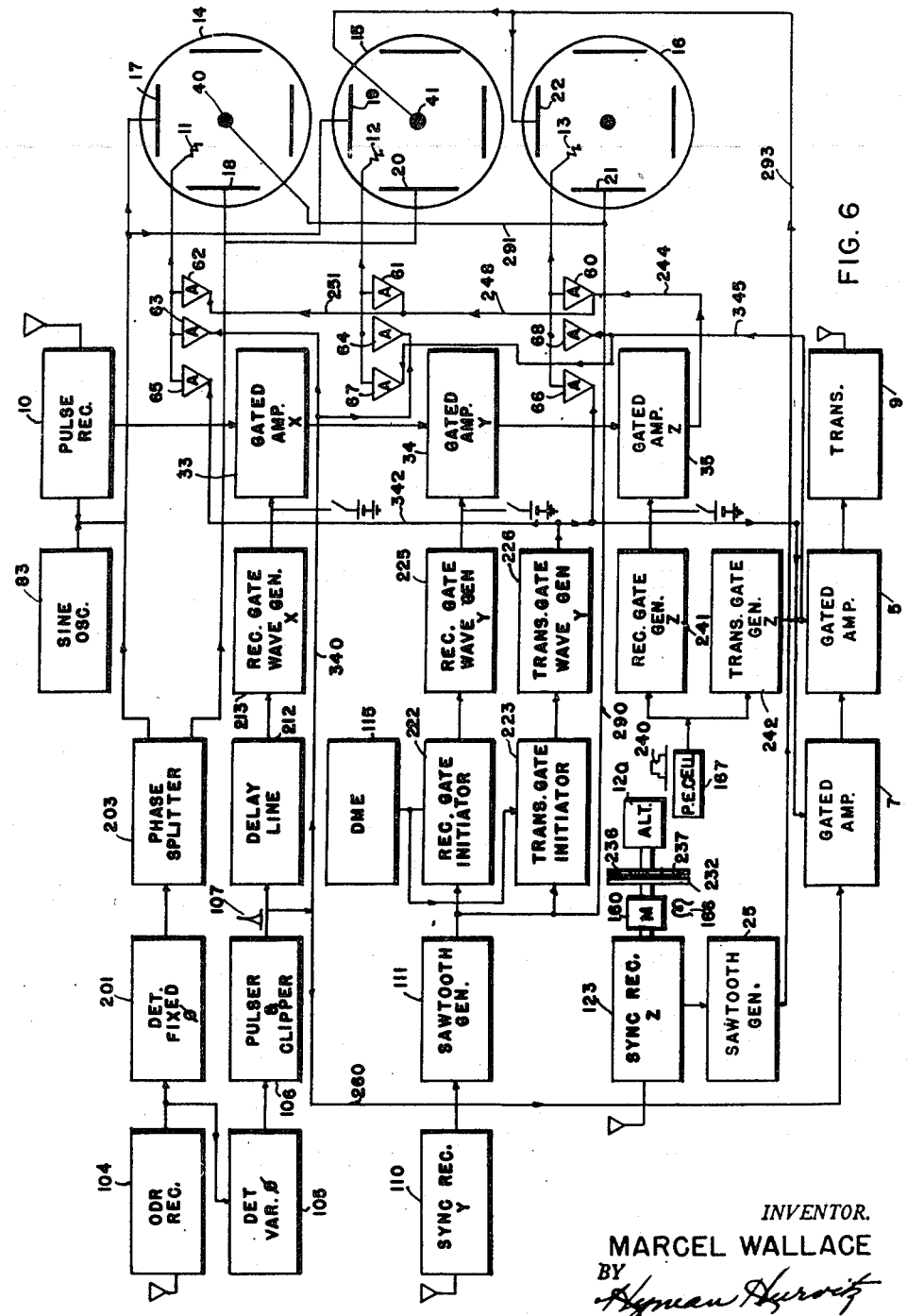
Figure 6 is a functional block diagram of a specific embodiment of the invention more generically illustrated in Figure 4 of the drawings.

Reference is now made generally to Figure 6 of the drawings wherein is illustrated in functional block diagram a complete receiving and transmitting system for installation aboard an aircraft, in accordance with the present invention. The system of Figure 6 utilizes ODR transmissions for establishing the $x$ time base of the system, and also utilizes these transmissions for determining the time positions of the pulses which represent the $x$ quantity. The time positions of pulses representing range in the embodiment of Figure 6, are determined by comparing the output voltage of a DME indicator with the voltage of a saw-tooth generator, the latter being synchronized from a periodic synchronizing signal which establishes the $y$ time base. Pulses corresponding with the $y$ quantity are generated by means of apparatus of the type illustrated in detail in Figure 8 of the drawings, and which has been explained hereinbefore. The time position of pulses corresponding with the $z$ quantity, or altitude, is determined in the system of Figure 6, by means of equipment of the type of that illustrated specifically in Figures 13, 14 and 15, of the drawings, and which has been explained in detail hereinbefore, by reference to a time base established by a periodic synchronizing pulse, provided from a ground station, in common to all the aircraft.

Referring more specifically to Figure 6 of the drawings, an ODR receiver is provided, which receives transmissions from an ODR transmitter of known type (not shown), and wherein the transmitted carrier is modulated with two 30 cycle signals, one of which varies in phase in accordance with the bearings of the receiving craft, and the other of which is of fixed phase omni-directionally with respect to the transmitter.

Identifying the ODR receiver by the reference numeral 104, a pair of detectors is disclosed coupled to the output of the ODR receiver, one of which, 201, abstracts from that output the 30 cycle signal of fixed phase, and the other, 105, abstracts from that signal the 30 cycle signal of variable phase. The output of the detector 201, which is a 30 cycle signal of identical phase aboard all the aircraft of the system, is applied to a phase splitter 203, the output of which, in two phases, is applied to mutually perpendicular deflecting electrodes 17, 18 and 19, 20 of cathode ray tube indicators 14 and 15, respectively. Accordingly the beams of the cathode ray tube indicators 14 and 15 will describe circular paths which are identically synchronized and phased in the indicators 14 and 15 aboard all the aircraft of the system.

The output of the detector of variable phase signals, 105, is applied to a pulser 106, the output of which is a pulse having a time position with respect to each cycle of the fixed phase output of the detector 201, which is representative of the bearing of the receiving craft.

Pulsers of the character of that functionally illustrated in Figure 6, and there identified by the reference numeral 106, may be of various characters, generally operating, however, in response to passage of the signal applied thereto through a zero value. We may assume, therefore, that each time the 30 cycle sine wave output, derived from the detector 105, passes through zero, a pulse is generated by the pulser 106, positive and negative pulses being generated alternately due to the manner in which the zeros of the sine wave occur. Pulser 106 may be provided with a negative pulse clipper, so that only positive pulses are provided at its output. The positive pulses, identified by the reference numeral 107, are applied to a delay line 212, which delays each pulse for a period equal to 90% of the basic interval between pulses, that is, one-thirtieth second. The output of the delay line 212 is applied to a gating wave generator, which generates the $x$ gating wave, extending for a period equal to 20% of the basic time interval of one-thirtieth seconds. Accordingly it will be evident that the gating wave generated by the generator 213 will straddle the time position corresponding with the bearing of the receiving craft, extending on either side thereof for a duration equal to 10% of the total base time interval $x$. The output of the gating wave generator 213 is applied to a gated amplifier 33, which is normally blocked, and opens the latter during the existence of the gating waves. A pulse receiver 10 is provided, which receives triple synchrometric pulses transmitted from remote craft, applying them after detection to the input of the gated amplifier 33. It will be evident, if each craft transmits pulses having time positions with respect to the $x$ time period corresponding with its own bearing, that only those received pulses which are adjacent in time positions to the pulses 107, by a factor equal to ±10% of the $x$ time interval, and hence ±10% of the total azimuthal extent, or 72°, will be enabled to pass through the gated amplifier 33. For the purposes of the present disclosure we have assumed a 20% gate, that is, we have assumed that the gate 33 is opened for 20% of the time of each base period of one-thirtieth seconds and closed for the remainder of the time. It will be obvious that this specific extent of time gate is completely arbitrary and might have been determined to have any other value at the discretion of the designer of the equipment. Further it is quite feasible to provide an $x$ quantity gating generator 213, which may be variable in respect to gating wave duration so that the pilot of any given craft may select the gate he desires, whether more or less than 20%. It is further feasible to provide a time gate, supplementary to the gate here described, which may be manually adjustable in respect to both its duration and its time position with respect to the $x$ time base interval, to enable searching of non-adjacent bearings for the presence of remote aircraft, and such a time gate is provided in an embodiment of the invention described hereinafter.

Those pulses which pass through the gated amplifier 33 by reason of their appropriate time positions are applied to the input of a further gated amplifier 34, which is normally closed, and which is gated opened periodically in a manner now to be described. A sync signal receiver 110 is provided aboard each of the craft for the purpose of receiving, from a ground station (not shown) synchronizing signals at the rate of three per second, this selected value being only for example. The sync signals may be assumed to be received aboard all the craft of the system at identical times and serve to establish a common $y$ time base aboard all the craft. The output of the sync signal receiver 110 is applied to a sawtooth generator 111, serving to start generation of a sawtooth voltage, which builds up in a linear fashion until the time of a succeeding pulse whereupon the sawtooth signal collapses and restarts its cycle. Accordingly the sawtooth generator 111 is seen to be of conventional type, synchronized by means of the output of the sync signal receiver 110.

The output of the sawtooth generator 111 is applied in parallel to two gating pulse initiators, 222 and 223, to which may also be applied voltage derived from a DME indicator, 115, that voltage having a value corresponding with the range of the craft with respect to a DME transponder 100 on the ground (see Fig. 5). The receiver gating pulse initiator 222 and the transmitter gating initiator 223 serve to compare the sawtooth output of the generator 221 with the steady value of voltage supplied by the DME indicator 224, generating a pulse upon arrival of the sawtooth amplitude in each initiator at a value related to steady voltage output of the DME, and slightly less than the latter, in a manner which has been disclosed hereinbefore in connection with the description of Figures 8 and 9 of the drawings. The difference between the gating wave initiators 222 and 223 resides in the durations and times of commencement of the gates established by each. So, the receiving gate indicator 222 may be adjusted to provide a pulse at a time previous to the time corresponding with the true range of the aircraft by 10% of the total time period of the $y$ time base, by suitable setting of tap 147, Figure 8. On the other hand the transmitting gate initiator 223 may be adjusted similarly to supply its pulse precisely 5% ahead of the true time position corresponding with the range of the craft. The output of the initiator 222 is applied to a $y$ receiving gate generator 225 which generates a square pulse starting at the time the output of the initiator 222 is received thereby and extending for a time equal to 20% of the total time base period. The output of the $y$ transmitter gate initiator 223 is likewise applied to a $y$ transmitter gate generator 226 which, however, commences in operation 5% of a base period $y$ later than did the receiving gate generator $y$, establishing a gate extending for 10% of the total $y$ time base period. The output of the receiver gate generator 225 is applied to gate open the gated amplifier 34.

A further sync signal receiver 123 is provided which receives from a suitable ground station 103, Figure 5, signals at a frequency of 1 per 3⅓ seconds, that is, at a rate 1/10 that of the signals received by the sync-signal receiver 110 and 1/100 of the fundamental rate established by the ODR receiver 104. The output of the sync-receiver 123 is utilized to synchronize and phase a drive motor 160, which operates accordingly at the rate of one revolution per 3⅓ seconds. Since suitable synchronizing equipments and systems for accomplishing this function are well known in the art, in connection especially with synchronizing of electric clocks at relatively long intervals, I do not describe any specific synchronizing system in detail, leaving it to those skilled in the art to select a suitable synchronizing system. The motor 231 drives a disc 232 which is shown in front elevation in Figure 16 of the drawing and which may be fabricated of any solid material such as metal or plastic, but which must be non-transparent except as described hereinafter. An aperture is provided in the disc 232, within which is fitted three windows 233, 234 and 235. Window 233 is completely transparent, but the windows 234 and 235 are semi-transparent. The angular extent of the opening 233 is precisely 10 per cent of the total circumference of the disc 232 and bisects the total aperture. The opening of the sectors 234 and 235 are each 5 per cent of this same quantity so that the total opening of the apertures comprising the windows 233, 234 and 235 is precisely 20 per cent of the total circumference. The window 233 is utilized to establish a transmitter gate which extends for 10 per cent of the basic time interval $z$ of three and ⅓ seconds whereas the sum of the gate 233, 234 and 235 is utilized to establish a receiver time gate which extends for the arbitrarily selected value of 20% of the total basic time interval. Co-axially with the disc 232 is provided a further disc 236, which is positioned by means of an altimeter 120 to have a position corresponding with the altitude of the craft. The disc 236 is provided with a thin radial slot 237, and may be identical with the disc 163 of Figure 15. A lamp 166 is provided on one side of the pair of discs 232, 236, and a photo-cell 167 on the other side to enable translation into electrical signals of the intensity and presence of any light rays passing through the discs 232 and 236 simultaneously.

It will be evident from the character of the windows 233, 234 and 235 that the photo-cell will receive light in steps, receiving a relatively small amount of light while the slot 237 is passing the windows 234 and 235, and a relatively great amount of light while the window 236 is passing the slot 237. Accordingly the output of the photoelectric cell 239 will represent a step shaped wave 240, having a peak extending for 10% of the basic time interval $z$ and a base extending for 20% of that same time interval.

The output of the photo-cell 167 is applied to a $z$ receiver gate generator which includes a peak clipper for removing the peak of the wave 240, applying to the gated amplifier 243 the base portion of the wave only. The gated amplifier 243 is accordingly opened for a period equal to 20% of the base time period $z$ and having a time position corresponding with the altitude of the aircraft or the value of the quantity $z$.

Those pulses received by the pulse receiver 10, which are able to pass through all the time gates 33, 34 and 35, arranged in series or cascade, accordingly have time positions within all three of the time intervals $x$, $y$ and $z$, which correspond within plus and minus 10%, with the value of the time positions corresponding with the bearing, range and altitude of the local aircraft. All received pulses which do not simultaneously come within this combination of values are rejected by the time gates, and do not appear at the output of the last gate 35. Those pulses which do arrive at the output of the last gate 35, are applied over a lead 244 to an isolating amplifier 60, the output of which is applied to an intensifying grid 13 of a cathode ray tube 16. From the input of the amplifier 60 extends a lead 248, which connects with the input of an amplifier 61, the output of which is connected with the intensifier grid 12, of the cathode ray tube indicator 15, and from the input of the amplifier 61, extends a further lead 251, which connects with the input of an amplifier 62, the output of which is connected with an intensifier grid 11, of the cathode ray tube indicator 14.

Accordingly, those pulses which pass through all three time gates 33, 34 and 35 are applied to the intensifying grids 11, 12 and 13 of the cathode ray tube indicators 14, 15 and 16, respectively, simultaneously, and cause an intensification of the beams of these indicators, said beams being normally cut back to provide no indications on the face of the indicators.

The output of the pulse clipper 106 is applied over a lead 260, to the input of the first of a pair of gated cascaded amplifiers 7 and 5. It will be recalled that the time position of the pulse 107, which is derived from the pulser and clipper 106, corresponds in its time position with respect to the basic time interval $x$ of the system, to the bearing of the local aircraft. The time position of the pulse 107, as applied to the gated amplifier 7, if available at remote aircraft or stations, would be interpretable in terms of the bearing of the local aircraft, upon suitable translation of the time position of the pulse into a visible indication.

The pulses 107 occur at the rate of 30 in each second, or one during each thirtieth of a second. The gated amplifier 7, however, in response to signals deriving from the $y$ transmitter gating generator 226 is opened for a period of one-thirtieth of a second only once during each one-third of a second, and accordingly permits only one of each ten pulses 107 provided by the pulser 106 to pass through the gated amplifier, the remaining nine pulses being eliminated. During each one-third of a second, then, a single pulse passes through the time gate 7 and is applied to the input of the gated amplifier 5. The latter is gated open for a time equal to one-third of a second during each three and one-third seconds, or for the period $y$ during each base period $z$. Accordingly again 90% of the pulses passing through the gated amplifier 7 are blocked by the gated amplifier 5, and one only of each ten pulses applied thereto passes through. That pulse is applied to the transmitter 9 and triggers the latter to transmit a single pulse, during each three and one-third seconds.

In the system of Figure 6, spots appearing on the faces of the indicators 14, 15 and 16 represent in the case of the indicator 14 a plot of bearing against range, in the case of the indicator 15 a polar plot of bearing against altitude, and in the case of the indicator 16 a plot in rectangular coordinate of the range against altitude, the system of Figure 6 being analogous to the system of Figure 4.

It is desirable in systems wherein many dots may occur, corresponding with the positions of many aircraft, that the position of the local or transmitting aircraft be distinguishable from indications corresponding with the positions of all other aircraft. To this end signals derived from the pulse clipper 106 are applied over lead 340 and via isolating amplifier 63 to the intensifier grid 11, of the indicator 14, and via isolating amplifier 64 to the intensifier grid 12 of the indicator 15. Since the output of the pulser 106 occurs at the rate of thirty times per second at time positions corresponding with local bearings and since the output of the pulse clipper 106 as applied to the indicators 208 and 209, via the isolating amplifiers 63 and 64, is ungated, all the pulses will appear, and the pulses will trace a radial line, consisting of ten dots, one for each possible range in the case of the tube 14 and for each possible altitude in the case of the tube 15.

There is likewise applied to the intensifier grid 11 of the indicator 14 a receiver gating pulse applied over the lead 342 and via isolating amplifier 65.

Similarly the output of the $z$ transmitter gate generator 42 is applied over a lead 345 and via isolating amplifiers 67 and 68 to the intensifier grids 12 and 13, of the indicator tubes 15 and 16, respectively. Since the output of the $z$ transmitter gate generator 42 consists of a square wave having a duration equal to the $y$ base time interval, and a time position substantially corresponding with local altitude, a convolution of a spiral accordingly is traced on the face of the indicator 15 at a radial position substantially corresponding with the altitude of the craft and likewise a vertical rectilinear line is traced on the face of the indicator 16 corresponding with the altitude of the local craft.

In this way there is produced on the face of the indicator 208 a radial line and a roughly circular line having a point of intersection corresponding, with slight error, with the positions of the local craft, in respect to range and azimuth. On the face of the indicator 209 is produced likewise a radial line and a roughly circular line, the point of intersection of which represents substantially the altitude versus the bearing of the local craft polar coordinate, and on the face of the indicator $y$ 247 is provided a pair of crossed rectilinear lines the point of intersection of which corresponds with range and altitude of the local craft.

Attention is directed to Figure 10 of the drawings, wherein is shown the appearance of the face of an indicator of either range versus bearing or altitude versus bearing, these having similar types of indications, that is polar plots, which is gated in respect to bearing only, and wherein the radial lines 370 represent local bearings, and the arcuate lines 371 represent local range or altitude, depending upon whether the indicator is a bearing-altitude or a bearing-range indicator. The speckled appearance of a sector of the face of the indicator is caused by the output of the sine wave oscillator 83. The dots occurring at the intersection of the lines 370 and 371 represent the local craft, and the remaining dots represent foreign craft.

For example, the dot 312, in Figure 10, assuming the latter to represent a polar plot of $x$ versus $y$, indicates an aircraft having bearing north of the local craft and at a range which may be estimated as about 20 miles further from the central station than the local craft, on the basis that the maximum range of the system is 100 miles.

In Figure 11 is shown the appearance of the face of a cathode ray tube indicator when gating occurs in both range and bearing, or bearing and altitude, simultaneously, the speckled portion of the face of the indicator representing the area of the indicator which is subject to reception of indications or gated in.

Likewise in Figure 12 is shown the appearance of the indicator 16 (Figure 6), the area of the gate in this case being rectangular, and the local position being indicated by two crossed rectilinear lines, one vertical and one horizontal, by reason of the type of display utilized in indicator 16, i. e., a display of $y$ versus $z$, or range versus altitude, in rectangular coordinates.

While certain lines in Figures 10–12 inclusive, have been illustrated as continuous and rectilinear, such illustration is idealized. The lines 370, for example, are actually made up of a series of discrete spots, which merge more closely as the ratio between the $y$ and $x$ time base intervals is increased. For a 10:1 ratio, which we have assumed in our examples, hereinbefore, departure from a continuous or unbroken line might be substantial.

The line 371 (Figures 10 and 11), which has been referred to as circular herein, is not actually circular but represents a convolution of a spiral, the pitch of which equals 10% of the total radial expanse of the face of the indicators 208, 209, and is shown as circular for the sake of simplicity and further because a truly circular trace may be approached by increasing the ratio of time durations between the base intervals $z$ and $y$.

Similarly the horizontal and vertical traces of Figures 12 are not truly rectilinear, but run on a bias for similar reasons. They have been shown as rectilinear and rectangular for the sake of simplicity, and since these conditions may be approached as the ratio of the $z$ to the $y$ time intervals is increased.

The operation of Figure 6 may perhaps best be understood by reference to Figure 17 of the drawing which represents a timing diagram for the system. In Figure 17 the $x$ time interval is represented by the space between each pair of adjacent lines 300. A pair of arrows demarcates multiples of 10 of the 1/30 second periods or $x$ time base, establishing a 1/3 second time period corresponding with the time base $y$. A further time base $z$ is demarcated by the line 311, extending across the entire expanse of the figure, and representing a total time duration of 3 1/3 seconds. Short vertical lines 304, which occur once during each of the $x$ time base period of 1/30 second represent pulses provided by the pulser 106, and represent the bearing of a local aircraft in terms of the time positions of the pulses 304 within the base time intervals $x$. The square waves 305 on the other hand represent the $y$ gating waves applied to the gated amplifiers 34, these gates extending for a time period of 1/30 second, occurring once in each 1/3 of a second, and having a time position within the $y$ base period corresponding with the range of the aircraft. Roughly interpreted, the pulses 305, as illustrated, represent an aircraft bearing due south. The pulses 304, on the other hand, represent an aircraft having a range, against a total or maximum range for the system, of 100 miles, somewhere between 60 and 70 miles.

The further gating wave 306 is provided, which extends across an entire time base period $y$, that is for 1/3 of a second, and which has a time position with respect to the time base $z$, corresponding with the altitude of the aircraft. If, for example, we assume a total altitude range for the system of ten thousand feet, the local aircraft is flying at approximately 6,000 feet.

It is evident, then, that one only of each ten of the pulses 304 can correspond in time position with a $y$ quantity gating pulse 305 and that only one of the square waves 305 can correspond in time position with the $z$ quantity gating wave 306. Only that one of the pulses 304 which corresponds in time position simultaneously with both a gating wave 305 and a gating wave 306 is enabled to pass to the transmitter, and effect transmission of a signal. The only one of the pulses 304 which were originally generated (by pulser 106, Figure 6) which fulfills this condition is the pulse 307. Accordingly in the present system, it will be clear only one per cent of all the pulses which are generated are actually transmitted. This figure is true, however, only on the basis of use of a 10:1 ratio between the period time base periods $z$, $y$ and $x$. A single pulse 307 represents in terms of its time position with respect to the time base $x$, represented by the distance between lines 300, with bearing of the transmitting craft; it represents with respect to the time base period $y$, extending between lines 301, the range of the transmitting craft; and with respect to the time base $z$ extending between lines 302, it corresponds to the altitude of the craft.

It will be evident that approximation is inherently present in transmissions of information in the present system, since the time position of the pulse 276 with respect to the time base $z$ does not normally correspond precisely with the center of the gating wave 271, but involves a deviation to one side thereof. This error is caused by the small ratio chosen, in our example, between the various time bases. Had the ratio been chosen to have a greater value, the percentage of error would have been decreased accordingly.

If we now assume that the pulse 307 has been transmitted to a remote craft, and if we assume that craft to have bearing, range and altitude which corresponds relatively closely with that of the transmitting craft, we will find aboard the receiving craft that three time gates are established. One, corresponding with the gating generator $x$, or 33 in Figure 6, the other corresponding with the gating generator $y$, or 34 in Figure 6, and the others corresponding with the gating generators $z$ or 35, in Figure 6, these time gates being represented in Figure 17 by the numerals 308, 309 and 310 respectively. It will be evident from a study of Figure 17 that the pulse 307 corresponds in time condition or falls within the time position corresponding with all of the gating waves 308, 309 and 310 and accordingly will be received aboard the aircraft as indicated. Other pulses, such as pulse 311, fall within the gating wave 310, but fail to fall within the gating wave 309. Such pulses would therefore be rejected and their rejection would take place on the basis that their time positions do not correspond with a range or a bearing or an altitude adjacent to that of the transmitting craft. Pulse 312, on the other hand, may be seen to be aligned with one of time gates 277, with one of time gates 278, and with time gate 279 simultaneously, and accordingly will be passed through the receiving gates of the system as conventionally indicated.

A pulse such as 313 is seen to fall within the time of the gate 310, and accordingly to represent an aircraft at an adjacent altitude to the altitude of the transmitting aircraft. However, it fails to fall within the proper range since the time position of the pulse 313 with respect to the time base $y$ does not correspond with the time position of any of gating waves 309 with respect to this same time base.

We turn now to the manner in which the time positions of received pulses are indicated on the cathode ray tube indicators 14, 15 and 16, in the system of Figure 6. It will be recalled that the beams of the indicators 14 and 15 are rotating at a speed of 30 times per second in circular paths, the phasing and the rate of rotation being identical for all the aircraft of the system, and that upon reception of a pulse, and passage of that pulse, through the gates 33, 34 and 35, the pulse is applied, in an intensifying polarity, to the grids 11, 12 and 13, of the tubes 14 and 15. Accordingly intensification of the beams of the indicators will occur at times during the rotation of the beams corresponding with the bearing of the remote aircraft, there being maintained a direct correspondence between the instantaneous angular position of the beams and the time positions of pulses in the respect to the time base $x$ in the system.

The output of the saw-tooth generator 111, which has a period corresponding with the base period $y$, is applied over a lead 290, and a further lead 291 to a radial deflecting anode 40 of the indicator 14. Accordingly the beam of the indicator 14 describes a complex path, consisting of a spiral having a rate of rotation of 30 cycles per second and a radial movement of one complete passage radially of the tube during each one-third of a second, that is during the time period $y$. Since the time position of each received pulse corresponds with respect to the $x$ time base period to a bearing and with respect to the $y$ time base period to a range, the time of establishment of the pulse on the grid 11, of the indicator 14, corresponds also with the range of the transmitting aircraft; for at the precise moment that the pulse is received the beam of the indicator 14 occupies a radial position corresponding with the range of the remote craft.

The sync receiver 123 which establishes the $z$ time period for the system synchronizes a saw-tooth generator 25, having a base period of one cycle per three and a third seconds. The output of the generator 25 is applied over a lead 293 to a radial deflecting anode 41 of the indicator 15, generating in the beam of the tube a radial component of motion, and causing the beam of that indicator to describe a spiral path, the instantaneous radial positions of the beam corresponding with altitudes, and the angular positions of the beam corresponding with bearings. Accordingly there is produced on the face of the indicator 15 a plot of altitudes and bearings of all aircraft which are sufficiently adjacent to the local aircraft so that their pulses are enabled to pass through the receiving time gates of the receiving craft.

In respect to the cathode ray indicator 16 we do not utilize the radial deflecting electrode but apply the output of the saw-tooth generator 111 to the horizontal deflecting electrode 21, and the output of the saw-tooth generator 25 to the vertical deflecting electrode 22 of the indicator, whereby is provided a plot in rectangular coordinate of the $y$ quantity against the $z$ quantity, that is, a plot of altitudes against ranges.

It proves desirable in systems of this type, that the gated areas of the indicators 14, 15 and 16 be distinguished from the ungated areas, that is from the areas within which no signals can be received regardless of the transmission of such signals from remote craft, by reason of the gating action in the local receiver. To this end a sine wave oscillator 83 is provided, the output of which is of relatively low intensity, considerably lower than the intensity of pulses at the output of the pulse receiver 10, and the output of the sine wave oscillator 83 is applied to the input of the gated amplifier 33. Accordingly sine wave signals which may be at a frequency of ten or fifteen thousand cycles per second, for example, are passed through the gated amplifiers 33, 34 and 35, so long as these amplifiers are simultaneously gated opened, and since during this simultaneous opening of the gates the beams of the indicators 14, 15 and 16 scan over the gated areas of the faces of the indicators, modulation of the beam occurs at a high frequency rate, and a speckling of the surface of the faces of the indicators occurs, to delineate the areas of the faces of the indicators which correspond with the open periods of the gated amplifiers.

Attention is now directed to Figure 7 of the drawings wherein is illustrated in functional block diagram, a ground station receiver system. In ground station receiver systems it is not necessary that the various time gates be maintained open at time positions corresponding with navigational parameters. It is, however, essential that an operator on the ground be enabled to bring into any one of his indicators any desired range of values of any one of the parameters. Accordingly in the system of Figure 7, variable gates are provided which may be positioned in respect to time position by manual adjustment, the duration of the gates being likewise adjustable manually.

Referring more specifically to Figure 7 of the drawings an ODR receiver is now provided which is identified by the reference numeral 104. It will be realized that if the indicating system is adjacent to an ODR transmitter, the 30 cycle of constant phase omni-directionally may be derived without utilizing a receiver. However, for the more generalized case, and assuming that the indicating receiver is remote from the ODR transmitter, a receiver is necessary, and accordingly it is provided in Figure 7. At the output of the receiver 104 is connected a detector for the fixed phase output of the ODR receiver, at a frequency of 30 cycles per second. The output of the detector 201 is applied to a phase splitter 203, which supplies two 30 cycle signals, in 90 degree phase relation. One of the 30 cycle signals is applied to the vertical plates, 17 and 19, of the indicators 14 and 15. The other of the signals is applied to the horizontal plates 18 and 20 of the same indicators. Thereby, the beams of the indicators 14 and 15 are caused to trace circular paths which are synchronized, and phase with the like circular paths of the beams of the similar indicators aboard the various aircraft of the system.

The output of the detector of fixed phase modulation 201 is further applied to a variable phase shifter 400, which provides for the possibility of shifting the phase of the output of the detector 201 over the entire 360 degrees of the wave, enabling the zero point of the signal to be placed anywhere within the short time interval $x$. Coupled to the output of the phase shifter 400 is a pulser 106, which, as has been indicated hereinbefore, provides at its output a positive pulse having a time position determined by the zero of the input signal thereto. Since the input signal is susceptible to phase shifting the pulse provided by the pulser 106 may be positioned anywhere desired within the short time interval $x$. The output of the pulser 106 is utilized to control the time of initiation of a square gating wave, by gating wave generator 213, which may be made manually adustable in respect to the duration of its output signal to provide an output signal having durations from approximately zero times to times of 1/60 second, encompassing the entire short time interval $x$. The output of the gating wave generator 213 is applied in turn to the gated amplifier 33, which is connected in series with the output of the pulse receiver 10. A sync receiver is provided for receiving sync-signals at intervals separated by the time base period $y$, that is at intervals of 3 in each second. These pulses are applied to a delay network 402 which is adjustable to provide a delay of from approximately zero time to a time of 1/3 seconds. The delay network should not be of the filter or transmission line type, but may be of the multivibrator type or the mechanical type, various networks being well known in the art which are capable of providing the long delay necessary for performing the function of the delay network 314. Pulses provided at the output of the delay network 402 are applied to operate a gating wave generator 225 which provides pulses of adjustable duration to gate on the normally blocked gating amplifier 316. By virtue of the delay network 402 and the gating wave generator 225, gating pulses may be provided at any point within the $y$ time interval and these gating pulses may be of any desired duration, from a duration of approximately zero time to a duration of approximately 1/3 of a second. Still a further sync pulse receiver 123 is provided for receiving sync pulses at intervals corresponding with the longest time base interval utilized in the system, that is the time base extending for 3 1/3 seconds.

The output of the sync pulse receiver 123 is applied to a pulse delay network 402, which may be adjustable to provide a variable time delay of from zero seconds to approximately three and one-third seconds. The output of the pulse delay network 403 may be applied to a pulse generator 241, which is manually adjustable to provide an output pulse having any desired time durations from zero to three and one-third seconds. The output pulse provided by the generator 241 is applied to a normally blocked gated amplifier 35, to gate the latter on. The gated amplifiers 33, 34 and 35 are connected in cascade to the output of the receiver 10, so that those pulses which fall within the gating time provided by the gating wave generators 213, 225 and 241 are enabled to pass through the gated amplifiers, and to be applied over a lead 404 to intensity grids 11, 12 and 13 of the cathode ray tube indicators 14, 15 and 16.

A saw-tooth generator 24 is connected to the output of the sync receiver 110, the saw-tooth generator 24 having a time period of one-third seconds, that is, requiring a time of one-third seconds to provide a voltage extending from zero to maximum value. The output of the saw-tooth generator is applied to the radial deflection anode 40 of the tube 14, and to the horizontal deflection plate 22 of the tube 16. Accordingly, there is provided a radial movement of the beam of the tube 14, and a horizontal movement of the beam of the tube 16, these movements being synchronized with the traverse of the time period $y$.

To the output of the sync receiver 123 is likewise connected a saw-tooth generator 25 which has a basic time period of three and one-third seconds, being synchronized by the output of the sync receiver 123.

The output of the saw-tooth generator 25 is connected in parallel to the radial deflecting electrode 41 of the tube 15, and to the vertical plate 21 of the cathode ray tube 16. Accordingly a component of motion is imposed upon the beam of the indicator 15 causing it to move radially in coordination with the time base period provided by the pulse receiver 123, and likewise the beam of the tube 16 is caused to move vertically in synchronism with the base time period $z$.

The ground operator is enabled to select any desired extent of bearing, range and altitudes for displaying on his cathode ray tubes, and in the ultimate may watch all bearings, all ranges, and all altitudes, within the capabilities of the system, by suitable adjustments of the delay networks, or phase shifters 400, 402 and 403, and of the gating wave duration adjustments of gating wave generators 213, 225 and 241.

In order to delineate the areas of the faces of indicators 14, 15 and 16 which correspond with the openings of the gated amplifiers 33, 34 and 35, a sine wave, relatively high frequency oscillator is connected with its output to the input of the receiver 10. The operation of this oscillator in the system, and the appearance of the indications provided thereby has been explained hereinbefore.

Figure 18:
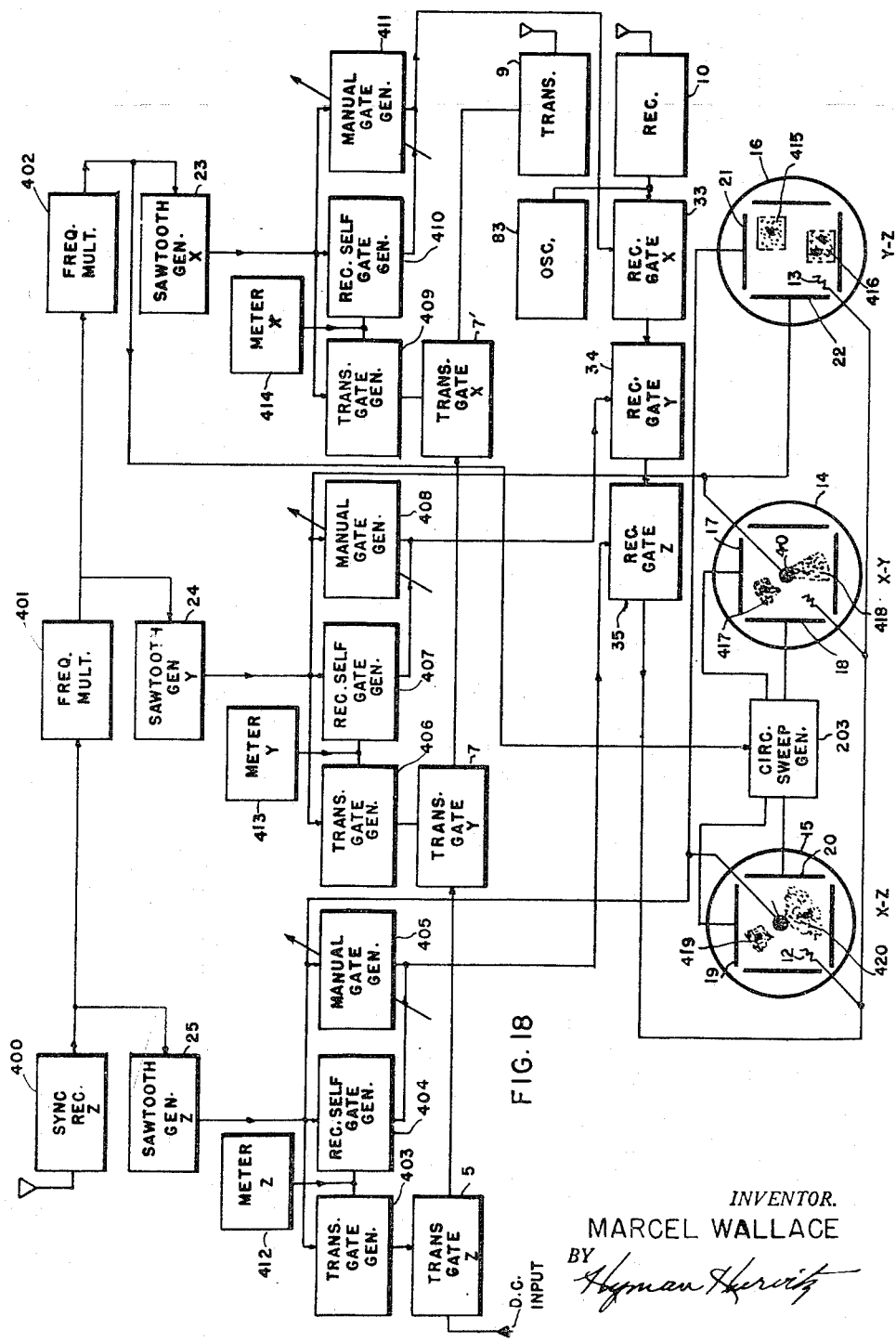
Figure 18 is a functional block diagram of a purely electronic self and manually gated transmitter and receiver-indicator system, in accordance with the invention.

Reference is now made particularly to Figure 18 of the drawings wherein is illustrated in functional block diagram an embodiment of the invention which is completely electronic, requiring no mechanical moving elements, and wherein the system is completely synchronized from a single synchronizing pulse, the $x$, $y$ and $z$ time bases being all derived from that pulse by a process of frequency multiplication. The $x$, $y$ and $z$ quantities are inserted into the system by means of electronic circuits of the type of that disclosed in Figure 8 of the drawings, the time constants relating to different ones of the quantities $x$, $y$ and $z$ being suitably adjusted. Additionally, in the embodiment illustrated in Figure 18 of the drawings a manually controlled gate is provided to supplement the meter controlled gate, to enable reception of pulses corresponding with any desired and manually selectable combination of values and ranges of values of the quantities $x$, $y$ and $z$.

Synchronization of the system of Figure 18 is accomplished by means of a sync signal receiver 400 which receives suitable synchronizing signals, such as pulses, from a ground station, at intervals which determine the $z$ time base. After detection in the receiver 400 the received signals are applied to a frequency multiplier 401 which supplies a multiplying factor determined by the desired relation between the $z$ and $y$ time bases. For the sake of example, in the present embodiment of the system, a factor of 1–10 has been selected. The output of the frequency multiplier 401 is likewise applied to a further multiplier 402 which supplies the further arbitrarily selected multiplying factor, 1–10. The output of the frequency multiplier 401 accordingly defines the $y$ time base and the output of the frequency multiplier 402 defines the $x$ time base. We may assume for the sake of example only that the sync signals received by the receiver 400 occur at the rate of one per second. The $z$ time base will accordingly extend for a time period of one second, the $y$ time base for a period of one-tenth second, and the $x$ time base for a period of 1/100 second.

The output of the sync signal receiver 400 synchronizes a sawtooth generator 25 which supplies a sawtooth wave of the type illustrated at 300 in Figure 17. The output of the frequency multiplier 401 is applied to synchronize the output of the sawtooth generator 24 which supplies a sawtooth wave having a frequency of ten cycles per second, and a character or shape as illustrated at 309 in Figure 17. The output of the frequency multiplier 402 likewise is applied to synchronize a sawtooth generator 23 which supplies output waves at the rate of one hundred per second, this output having the character of the signals illustrated at 308, in Figure 17.

The output of the $z$ sawtooth generator 25 may be applied in parallel to a series of gating wave generators 403, 404 and 405, each of which provides a gating wave timed with respect to each time base. Likewise the $y$ sawtooth generator 24 applies its output to three gating wave generators 406, 407 and 408, each of which provides gating waves within the $y$ time base periods. The sawtooth generator 23 is connected to apply its output to three gating wave generators 409, 410 and 411, which provide gating waves within the $x$ time base periods. Each of the gating wave generators 403 to 411 inclusive is precisely of the character of the gating wave generator illustrated in Figure 8 of the drawings, and which has been explained hereinbefore.

The gating wave generators 403, 404 are controlled in response to the electrical output of a meter 412, which measure the $z$ quantity. In our example, the $z$ quantity may represent altitude of an aircraft. In such event, the meter 412 may comprise an altimeter which provides a voltage output, in a negative sense, the value of which is determined by the altitude of the instrument.

The gating wave generators 406 and 407 are controlled by a meter 413 which measures the $y$ quantity, which, in applying the present system to navigational uses, may represent range of the equipment. For example, the meter $y$ may be broadly utilized to represent a DME equipment of the type which has been described hereinbefore in connection with other embodiments of the invention. The gating wave generators 409 and 410 may be controlled in response to the output of a meter 414 which measures the $x$ quantity, and which in our example may represent bearing with respect to a predetermined geographic location.

The gating wave generators 403 and 404 may accordingly be caused to generate gating waves having a center time value with respect to the $z$ time base determined by the value of the $z$ quantity. The gating wave generators 406 and 407 may likewise be caused to generate gating waves having a center value of time with respect to the $y$ time base corresponding with the value of the $y$ quantity, and the gating wave generators 409 and 410 may be caused to generate gating waves having center values of time with respect to the $x$ time base, which are determined by the value of the $x$ quantity.

Since the ratio between the $x$, $y$ and $z$ time bases have been selected, for the sake of example, to have a value of 10, the gating wave provided by the $z$ gating wave generator 403, which is utilized for controlling times of transmission of $z$ pulses, has a duration equal to one-tenth of the $z$ time base or one-tenth second, and is applied to gate open a $z$ transmitter gate 5, which may take the shape of a normally blocked amplifier which is turned on in response to the gating wave. To this amplifier is applied a D. C. voltage, over a lead 412. Accordingly, at the output of the $z$ transmitter gate 5 is present a D. C. pulse having a duration equal to one-tenth of the $z$ time base interval and having a time position with respect to the $z$ time base which is determined by the value of the $z$ quantity. This pulse is applied to the input of a $y$ transmitter gate 7, which is normally blocked.

The output of the $y$ transmitter gating generator 406 is applied to turn on the transmitter gate 7 for the duration of the gating pulse generated by the gating generator 406. Since this pulse occurs once during each of the time base periods $y$, and extends for a time equal to one-tenth of that period, there will be coincidence of the gating wave provided by the $y$ gating wave generator 406 and the output of the $z$ transmitter gate 5 only during one of each ten transmitter gating waves provided by the generator 406, and since that gating wave has a duration equal to one-tenth of the duration of the wave provided at the output of the gate 5, nine-tenths of the latter wave will be cut off, and one-tenth of the wave left, by the gating amplifier 7. That wave will have a duration equal to one-tenth of the $y$ base or $1/100$ of a second and will have a time position with respect to the $y$ time base interval corresponding with the value of the $y$ quantity and will further have a value with respect to the $z$ time base corresponding at least approximately with the value of the $z$ quantity.

The output of the transmitter gate 7 is applied to the input of a transmitter gate 7' which again constitutes a normally blocked amplifier which is gated open by the output of the $x$ transmitter gating generator 409, the latter having a time position determined by the value measured by the $x$ meter 414, and having a duration which may extend for only a relatively few microseconds. Accordingly, the output wave provided by the $y$ transmitter gate 7 is reduced in respect to duration by the $x$ transmitter gate 7'; the output of the latter having a duration of a few microseconds at a time position corresponding with the reading of the $x$ meter 414.

The output of the $x$ transmitter gate 7' is applied to pulse a transmitter 9 the latter then radiating to all adjacent aircraft, as well as to ground stations, pulses having a time position with respect to the $x$ time base which represents the $x$ quantity, having a position with respect to the $y$ time base which represents approximately the $y$ quantity, and having a time position with respect to the $z$ time base which represents approximately the $z$ quantity.

It will be realized, of course, that the time of commencement of each of the gating waves provided by the gating waves generators 403, 406 and 409 may be determined by the setting of the rheostat 145, in Figure 8, and that the duration of the gating wave provided by the generators may be determined by adjustment of the square wave generator 154 in that figure.

The $z$ meter 412 controls additionally a receiver self gating generator 404, the $y$ meter 413 controls a receiver self gating generator 407, and the $x$ meter 414 controls an $x$ receiver self gating generator 410, these latter each providing a timing or gating wave having the center time position corresponding with the reading of the associated meter and a duration which may be arbitrarily determined in the present system. In previous embodiments of the invention, we have selected relative values of receiver gating corresponding with a twenty percent gate, that is, the receiver channels have been open for twenty percent of the duration of the associated time base intervals. This value is, of course, arbitrary, and is selected to provide a concrete example of a suitable value. The output of the receiver self gating generator 404 is applied to a receiver gate 35, which is normally blocked, and which is turned on in response to the gating wave. Likewise, the output of the $y$ receiver self gating generator 408 may be applied to a receiver gate 34 which is normally blocked, and which may be turned on in response to the gating wave. The output of the $x$ receiver self gating generator 410 may be applied to an $x$ receiver gate 33, which is normally blocked, and which is turned on in response to the gating wave. The receiver gates, accordingly, are operated precisely as in preceding embodiments of the invention, and being connected in cascade, triple synchrometric pulses received from remote transmitters may be passed through all the gates only if these pulses have time positions with respect to each of the time base intervals $x$, $y$ and $z$ which are within plus or minus ten percent of the local values of the quantites $x$, $y$ and $z$. Should a received pulse come with this range of values simultaneously it will be applied in parallel to the intensifier grids 11, 12 and 13 of the cathode ray tube indicators 14, 15 and 16 as in all the other embodiments of the invention. The indicators 14 and 15 display respectively, in polar coordinates, relations between the values $x$ and $y$ and between the values $x$ and $z$, while the indicator 16 represents, in rectangular coordinates, relationships between the value $y$ and $z$.

The system as so far described, accordingly, is quite similar to the system of Figure 6 except in two specific respects. These are (1), that the time base intervals are delineated by frequency division and that the entire system is synchronized from a single pulse having a time interval therebetween which is determined by the $z$ time base interval, and (2), the fact that all the gating waves are generated electrically, by means of circuits of the character illustrated in Figure 8 of the drawings, and described hereinbefore.

Still a further feature of novelty in Figure 18 of the drawings relates to the manually controlled gating waves which are applied to the receiver channel to enable reception of pulses within any desired range of values of $x$ or $y$ or $z$ or any combination of these. The required gating waves are generated by the manual gating wave generators 405, 408 and 411, which generate gating waves manually adjustable in both position and duration with respect to the $z$, the $y$, and the $x$ time bases. By suitable adjustments potentiometer 145, Figure 8, the initial points of these gating waves may be set at any desired position within the time base interval and by suitable adjustments of the square wave generator 154, Figure 8, the durations of these gating waves may be adjusted to have any desired value up to and including the full time base intervals. Accordingly, signals may be received, for example, within all azimuthal directions for a restricted range of altitudes and ranges, or alternatively, adjustments may be effected to enable reception of pulses corresponding with all ranges and all bearings, the indications being restricted only in respect to the altitudes within which they originate, and any desired range of altitudes may be selected for study.

In order that the pilot of an aircraft may be enabled to determine precisely those areas of his indicator within which pulses may be expected to occur, should such pulses exist, the oscillator 83 is provided which is connected with the input of the receiver 33 and which is of sufficiently high frequency to transmit energy through the receiver gates so long as they are all simultaneously open. The energy provided by the oscillator 83 may, as in other embodiments of the invention, be of sufficiently low intensity to dimly light up areas of the screens of the oscilloscopes 14, 15 and 16 corresponding with the areas which are being gated open; so, the faces of the indicators 14, 15 and 16 are illustrated in Figure 18 of the drawings with lighted portions 415 and 416 on the indicator 16, 417 and 418 on the indicator 14, and 419 and 420 on the indicator 15. The indications 415, 417 and 419 may represent the self gated indications, that is, those indications which arrive at the indicators by virtue of the gates provided by the gating wave generators 410, 407 and 404. On the other hand, the indications within the areas delineated by the indications 416, 418 and 420 may be those provided by the manually controllable gates, each of which may be quite independent of all other gates in the system, and also independent of the values of the quantities $x$, $y$ and $z$.

No provision has been included in Figure 18 for identifying the indications on the face of indicators 14, 15 and 16 which correspond with the position of the local craft. Such provision has been disclosed in connection with other embodiments of the invention and may be applied in like manner to the embodiment of the invention illustrated in Figure 18 of the drawings. However, such provision is not essential, in Figure 18, or in any other embodiment of the invention wherein is provided an oscillator 83, since the latter visually defines the on-gated areas of the indicator and the position of the local craft is always precisely centrally of these areas, and may therefore be readily distinguished from other indications.

Figure 19:
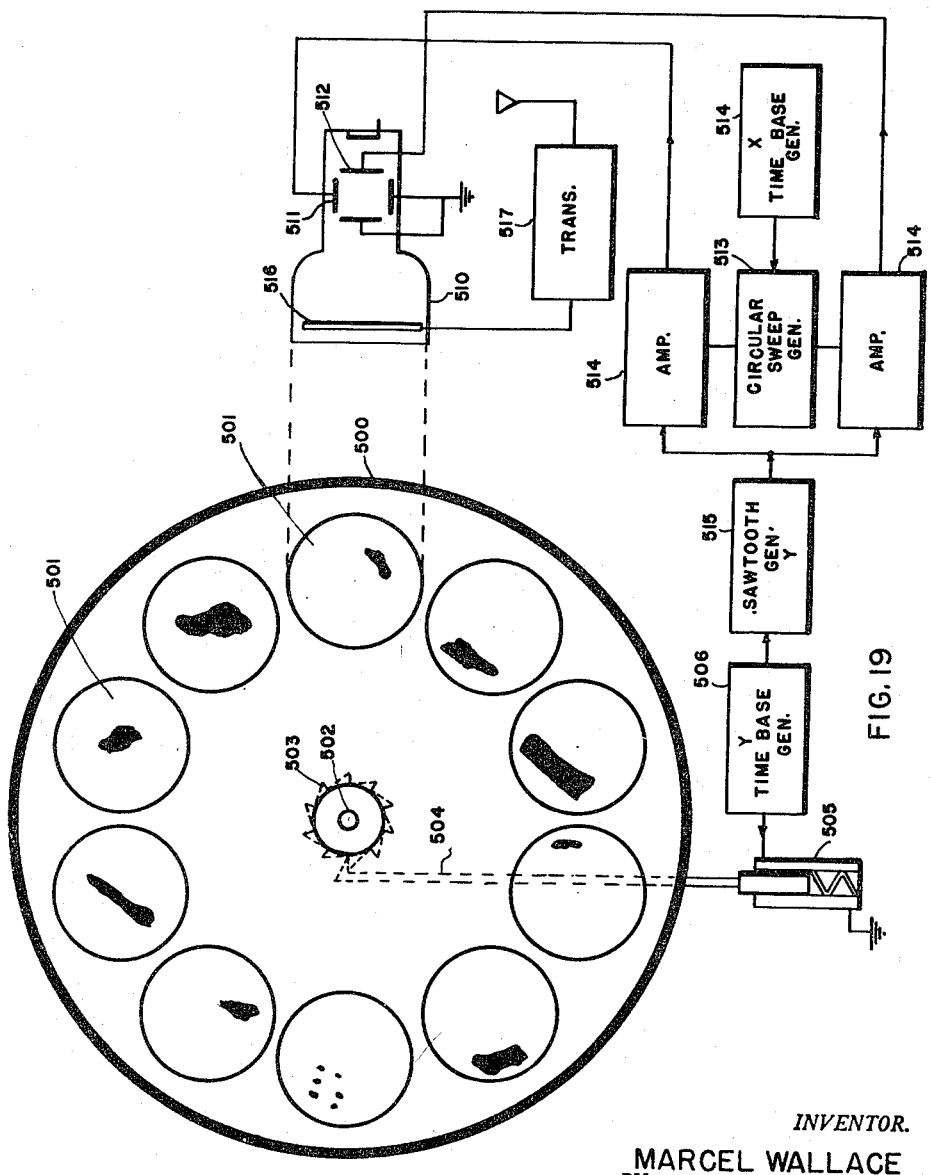
Figure 19 is a functional block diagram of a chart and terrain feature transmitter, in accordance with the invention.

In Figure 19 of the drawings is illustrated an apparatus for providing pulses having time positions such that when interpreted at receiving stations in the present system there will be reproduced maps corresponding with sections taken at given altitudes above sea level, over given terrain. For example, if we assume that in the present system aircraft are operating with respect to a given geographic location and are transmitting pulses having positions corresponding with their ranges and bearings with respect to that location and further time positions corresponding with the altitudes of the craft above sea level, we may likewise transmit maps showing terrain features centered about that predetermined geographic location, and taken in sections at given altitudes. If, for example, adjacent to the geographic location there is a mountain separate maps may show horizontal sections taken through the mountain at various altitudes, for example altitudes of 1,000, 2,000, 3,000, 4,000 feet, etc., each map corresponding with one of the altitudes. The maps, themselves, may be otherwise of conventional character, that is, they may be polar maps, centered on the predetermined location, and may have an extent radially determined by the maximum distance which is to be measured in the system.

Referring more specifically to Figure 19 of the drawings, a large disc 500 is provided to which may be secured a plurality of circular charts or maps 501, spaced at equal angles and on equal radii about the face of disc 500. The disc 500 may be mounted for rotation about a shaft 502, on which is mounted a ratchet wheel 503, which is operated by a pawl 504, the latter being in turn actuated by an electromagnet 505. The electromagnet 505 is energized by a time base generator 506 which is synchronized with respect to the $y$ time base in the present system. The manner of generating the $y$ time base may be variously determined. So in a system of the character of Figure 18, the $y$ time base may be derived from the $z$ time base by frequency division and multiplication. On the other hand, in a system of the character of Figure 6 the $y$ time base generator may be represented by a sync signal receiver 110. Regardless of how the $y$ time base pulses are generated, however, each pulse is caused to energize the electromagnet 505, which, in response to energization, actuates the pawl 504, which rotates the disc 500.

In a specific example of the invention ten such charts may be provided, each representing terrain features at a horizontal section taken at intervals of 1,000 feet of altitude above sea level. It will be realized that this figure is not limiting but that closer separation may be provided or that greater altitudes may be provided for by providing additional charts 501 and adjusting or designing the ratchet wheel 503 accordingly. It is, however, essential, that the total number of the charts 501 be equal to the ratio between the $y$ and the $z$ time bases, since in the system each one of the charts 501 is scanned by means of an iconoscope 510, for a portion of the $z$ time base interval. Thereafter a further $y$ time base pulse is provided by generator 506, electromagnet 505 is energized, the disc 500 is turned, and a succeeding chart for a succeeding altitude is scanned by the iconoscope. It is essential that completion of scanning of all the discs 501 take place during each basic time interval $z$, and this will only be possible if the total number of charts correspond with the ratio between the $z$ and the $y$ time base intervals.

An iconoscope 510 is provided which has two pairs of mutually perpendicular electron beam deflecting electrodes, 511 and 512, which are energized from the output of a circular sweep generator 513, the latter operating in synchronism with the output of an $x$ sinc signal generator 514. The latter may be synchronized by $x$ time base sinc signals, as in Figure 6, or may be synchronized by frequency division from the output of a $z$ sinc signal receiver, as in Figure 18, as desired. Regardless of how the $x$ sinc signals are derived, however, they may be utilized to determine the frequency and the phase of the output of the circular sweep generator 513, that output corresponding with two signals having mutual phase displacements of 90°. Each of the signals may be applied to a separate amplifier 514 the gain of which may be controlled by means of an A. V. C. voltage provided by a sawtooth generator 515 which is synchronized from the output of the $y$ time base generator 506. Accordingly, the output of the amplifiers 514 comprise two signals which change gradually in amplitude, in linear fashion, from a small value to a maximum value adequate to provide maximum deflection of the beam of the iconoscope 510, when applied to the deflecting electrode 511 and 512. Since the frequency of the output of the circular sweep generator 513 determines the rate of rotation of the beam of the iconoscope, and since the output of the sawtooth generator 515 determines the radial position at which the circular sweep takes place, the scanning electron beam of iconoscope 510 scans continuously and repetitively in a polar fashion, or in a succession of spiral sweeps of constantly increasing radius.

The iconoscope 510 is positioned with respect to the disc 500 so that each one of the charts 501, in succession, is positioned oppositely to the face of the iconoscope 510, and the features of the maps are scanned thereby and translated into pulses of an electrical nature. These impulses are applied from the output electrode 516 of the iconoscope 510 to a transmitter 517 and serve to key the latter on, or off, in accordance with whether dark or bright areas of the map are being scanned.

The signals provided by the transmitter 517 then represent the terrain features of all the maps 501, these latter being scanned successively, and completion of the entire sequence of maps being completed during each $z$ time base interval Each map is scanned during a portion of the $z$ time base interval corresponding with the altitude represented by that map. Airborne receivers 10, aboard the aircraft, and which feed $z$ gates 35 which are open while any of the charts 501 are being scanned, will apply signals to the indicators 14, 15 and 16 suitable for effecting reproduction thereon of the terrain features present on the map.

One further feature of the present invention is deserving of particular mention. In this connection reference may be had to Figure 3 of the drawings.

If the timing of visual indications on the faces of the indicators 14 and 15 be considered, it will become evident that each indication is initiated at a time having a definite relation to the $z$ time base. If the time position of signals corresponding with local altitude of a receiving craft be considered as a starting point, signals received from aircraft at a higher altitude arrive later and those from an aircraft at a lower altitude arrive sooner. The visual indications on the faces of the indicators 14 and 15 are initiated in response to the signals, and then commence to fade, each signal brightening and then fading at the $z$ repetition rate, or say once in each second. Accordingly, merely by visual observation of the times of brightening of the indications on the faces of indicators 14 and 15, which originate remotely, with respect to those which originate locally, it may be determined whether the remote aircraft is higher or lower in altitude than the local craft, and approximately by how much.

This leads to the conclusion that the indicator 16 may be dispensed with, without destroying its function entirely, which is of great importance when economy of equipment is a factor of design.

What I claim and desire to secure by Letters Patent of the United States is:

1. In combination, means for generating a plurality of substantially equally time spaced pulses having each a time position with respect to a predetermined time base which is determined by the value of a first measurable quantity, means for selecting only certain of said pulses, selection being accomplished in accordance with the value of a second measurable quantity, and means for discarding only certain of said selected pulses in accordance with the value of a third measurable quantity.

2. In combination, means for generating periodic pulses, means for determining the time positions of said periodic pulses with respect to the period thereof, in accordance with the value of a measurable quantity, means for establishing periodic gates for said pulses each gate having a duration equal to the period of said pulses, and said gates having a time interval intervening therebetween which is greater than the period of said pulses, means for establishing the time position of said gates in accordance with the value of a measurable quantity, means for establishing further periodic gates for said pulses, each further gate having a duration equal to the period of said first mentioned gates and said further periodic gates having a period therebetween greater than the period of said first mentioned gates and means for determining the time positions of said further gates with respect to the period of said further gates in accordance with the value of a measurable quantity.

3. In combination, a station having means for transmitting pulses having each time positions simultaneously with respect to each of at least three different repetitive time intervals, the time positions of each of said pulses with respect to said time intervals being representative simultaneously of the values of three quantities, a remote receiver for said pulses, said receiver comprising means for translating said pulses into visual indications of the values of said quantities.

4. The combination in accordance with claim 3 and wherein said receiver comprises means for rejecting pulses occurring without a predetermined range of times within at least one of said time intervals.

5. The combination in accordance with claim 3 and wherein said receiver comprises means for accepting pulses occurring simultaneously within predetermined ranges of each of said time intervals.

6. In combination, a plurality of relatively remote stations having each means for generating and transmitting pulses, each pulse having time positions simultaneously with respect to each of three repetitive time intervals, means for establishing said time intervals in common to each of said stations, means for establishing the time positions of said pulses generated and transmitted at each of said stations simultaneously with respect to each of said time intervals in accordance with values of each of three parameters, respectively.

7. The combination in accordance with claim 6 and further comprising receiving means for said pulses at each of said stations.

8. The combination in accordance with claim 6 and further comprising receiving means for said pulses at each of said stations, and gating means associated with said receiving means for excluding from said receiving means pulses originating at any of said remote stations which fall within a predetermined range of values of time position within at least one of said repetitive time intervals.

9. The combination in accordance with claim 6 and further comprising receiving means for said pulses at each of said stations, and gating means associated with said receiving means for admitting pulses originating at any of said remote stations which fall only and simultaneously within predetermined ranges of values of time position within said at least three repetitive time intervals.

10. In combination, a transmitter for transmitting constant frequency time pulses having a variable time characteristic in accordance with the value of a first parameter, and means for determining the time positions within two different time intervals simultaneously of pulses transmitted by said transmitter, in accordance with the values of two further parameters, respectively.

11. In combination, a plurality of elevated stations, each station having a pulse transmitter, means for transmitting pulses from each of said transmitters having time position representative of its elevation, and means for further modulating each of said pulses from each of said transmitters in accordance with a plurality of further navigational parameters of each of said stations, respectively.

12. In combination, means for generating signals timed simultaneously with respect to three different time bases, means for receiving said signals, means for translating said signals into spatial indications, and means for disabling said translating means for predeterminable time ranges in at least one of said time bases.

13. In combination, means for establishing aboard each of a plurality of movable objects a triplet of time intervals, means for transmitting from each of said objects a single pulse having a time position of navigational significance simultaneously with respect to all of said time intervals, means for receiving and translating said pulse into indications of the values of said navigational quantities at the remainder of said objects.

14. The combination in accordance with claim 13 and further comprising means of rendering said receiving and translating means operative for predetermined fractional portions of at least one of said time intervals.

15. The combination in accordance with claim 13 and further comprising means for rendering said receiving and translating means operative only for predetermined overlapping portions of all of said time intervals.

16. In a radio navigational system for moving craft, means for transmitting from each of said craft radiant energy pulses having time positions with respect to first repetitive time intervals of predetermined duration and time positions determined by the bearing of said each craft, means for determining the time positions of said pulses simultaneously with respect to second repetitive time intervals of predetermined durations, said last mentioned time positions determined by the range of said each craft with respect to a predetermined geographic location, and means for further determining the time positions of said pulses simultaneously with respect to third repetitive time intervals of predetermined durations, said last mentioned time positions determined by the altitude of said each craft.

17. In combination, means for establishing a first, a second and a third time base of mutually ascending orders of magnitude, means for generating a radiant energy pulse having time positions simultaneously with respect to each of said time bases in accordance with a first, a second and a third information bearing value, respectively, a radio receiver for said pulse, and a plurality of translating indicators coupled to said receiver for translating said pulse into visual indications of the said values.

18. The combination in accordance with claim 17 wherein said indicators are facsimile type recording means for providing independent time records of said values.

19. The combination in accordance with claim 18 wherein is provided means for completely preventing indications on said indicators for predetermined portions of any one of said time bases.

20. The combination in accordance with claim 17 wherein said indicators are adapted to indicate a relationship between the time positions of said pulse in respect to a pair of said time bases.

21. The combination in accordance with claim 17 wherein said indicators comprise cathode ray tubes having visual indicating faces, means for establishing coordinate systems in the face of each of said tubes, each coordinate system utilizing a different pair of said time bases for establishing the units of the coordinate system, said cathode ray tubes each further comprising a beam intensifier electrode, and means for applying pulse output of said receiver to each of said beam intensifier electrodes.

22. In a telemetric system, means for establishing a first time base, means for establishing a second time base, means for establishing a third time base, said time bases being each of a different order of magnitude, means for generating a pulse, having a position with respect to said first time base determined by a first value, a position with respect to said second time base determined by a second value, and a position with respect to said third time base determined by a third value, a pair of indicators, having each an indicating face and a scanning means for effecting an indication thereon and movable in two coordinate directions on said face, means for driving said scanning means of one of said indicators in a first of said two coordinate directions at a rate synchronized with time elapse in said first time base, means for driving said scanning means of said one of said indicators in a second of said two coordinate directions at a rate synchronized with time elapse in said second time base, means for driving said scanning means of the other of said indicators in a second of said two coordinates at a rate synchronized with said third time base, and means for actuating both said scanning means for effecting indication on the face of the indicator associated therewith in response to application of said pulse to said scanning means.

23. In combination, means for transmitting a pulse having significance simultaneously in respect to range, bearing, and altitude of an aircraft, means for receiving said pulse, and means responsive to said pulse when received for providing visual plots of range versus bearing, of altitude versus bearing, and of range versus altitude.

24. In combination, a first station having means for generating a pulse having time positions simultaneously with respect to each of three different time intervals, a second station having means for indicating the time positions of said pulse simultaneously with respect to said three different time intervals, said last means comprising three cathode ray tube indicators, each having means for generating a cathode ray beam, means for sweeping the cathode ray beam of each of said cathode ray tube indicators over a predetermined path during one of said time intervals, and means for modulating said beams simultaneously in response to said pulse.

25. In combination, a first station having means for generating a pulse having time positions simultaneously with respect to each of at least three different time intervals, a second station having means for indicating the time positions of said pulse simultaneously with respect to said at least three different time intervals, said last means comprising at least three cathode ray tube indicators, each of said cathode ray tube indicators having means for generating a cathode ray beam, means for sweeping the cathode ray beam of each of said cathode ray tube indicators over a first predetermined path during one of said time intervals and in a further predetermined direction during another of said time intervals, and means for modulating said beams simultaneously in response to said pulse.

26. In combination, first means for generating an $x$ time base, second means for generating a $y$ time base, third means for generating a $z$ time base, said $x$, $y$ and $z$ time bases being of ascending orders of duration, respectively, means responsive to said first, second and third means for controlling timed $x$, $y$ and $z$ gates, respectively, said gates each adapted and arranged for passing a signal when open and for rejecting said signal when closed, means for generating a pulse having a significant time position with respect to said $x$, $y$ and $z$ time bases simultaneously, and means for applying said pulse to said $x$ gate, for passage therethrough, means for applying said pulse, upon passage of said pulse through said $x$ gate, to said $y$ gate for passage therethrough, means for applying said pulse, upon passage of said pulse through said $y$ gate, to said $z$ gate for passage therethrough, and means for indicating the time positions of said pulse with respect to said $x$, $y$ and $z$ time bases only upon passage of said pulse through said $x$, $y$ and $z$ gates.

27. The combination in accordance with claim 26 wherein said last means comprises cathode ray tube indicators having cathode ray beam generators, means responsive to said first, second and third means for establishing sweeps of said cathode ray beams in synchronism with said $x$, $y$ and $z$ time bases.

28. The combination in accordance with claim 26 wherein said last means comprises a first cathode ray tube indicator responsive to said pulse and to said first and second means for displaying the relation of the time position of said pulse simultaneously with respect to said $x$ and $y$ time bases, and a second cathode ray tube indicator responsive to said pulse and to said first and third means for displaying the relation of the time position of said pulse simultaneously with respect to said $x$ and $z$ time bases, and a third cathode ray tube indicator responsive to said pulse and to said second and third means for dispaying the relation of the time position of said pulse simultaneously with respect to said $y$ and $z$ time bases.

29. The combination in accordance with claim 26 wherein said means for indicating comprises three facsimile type recorders having each a record receiving surface, a means for scanning said record receiving surface, and a means responsive to said pulse for creating a record on said record receiving surface, and means responsive to said first, second and third means for synchronizing scanning of said three facsimile type recorders, respectively.

30. The combination in accordance with claim 26 wherein is provided a source of continuous alternating current signal, and means for applying said continuous alternating current signal to said $x$ gate.

31. The combination in accordance with claim 26 wherein said $x$, $y$ and $z$ gates are controllable in respect to time position with respect to said $x$, $y$ and $z$ time bases, respectively.

32. In combination, first means for generating repetitive $x$ time bases, second means for generating repetitive $y$ time bases, third means for generating repetitive $z$ time bases, said $x$, $y$ and $z$ time bases being of ascending orders of duration, respectively, means for establishing periodic pulses having each a predetermined time position with respect to said $x$ time base, means for establishing repetitive $y$ gates having each an open duration equal to the duration of an $x$ time base, and having a predetermined time position with respect to said $y$ time base, means for applying said pulses to said $y$ gates for passage through said $y$ gates of selected ones of said pulses only, while said $y$ gates are open, means for establishing repetitive $z$ gates having each an open duration equal to the duration of a $y$ time base and having a predetermined time position with respect to said $z$ time base, and means for applying pulses passing said $y$ time gate to said $z$ time gate for passage therethrough, and means for transmitting pulses passed by said $z$ time gate.

33. In combination, means for measuring bearing with respect to a geographic position, said means comprising an omni-directional range receiver, means for measuring distance from said position, means for measuring altitude, means for translating said bearing, said distance and said altitude into time positions of a single pulse with respect to three different time bases.

34. In combination, aboard a single aircraft, an omni-directional range receiver for deriving signals defining periodic time intervals which are invariable with respect to bearing of said aircraft from a predetermined geographic position, and for deriving further signals comprising pulses having each a time position with respect to one of said time intervals which is representative of bearing, range means aboard said aircraft for measuring range of said aircraft from said predetermined geographic position, altimeter means aboard said aircraft for measuring altitude of said aircraft, means responsive to said range means and to said altimeter means for selecting certain of said signals in accordance with said range and said altitude, and for rejecting others of said signals, and means for transmitting signals selected by said means for selecting.

35. In combination, aboard each of a plurality of aircraft, an omni-directional range receiver for deriving signals defining periodic time intervals which are invariable with respect to bearing of said aircraft from a predetermined geographic position, and for deriving further signals comprising pulses having each a time position with respect to one of said time intervals which is representative of bearing, range means aboard said aircraft for measuring range of said aircraft from said predetermined geographic position, altimeter means aboard said aircraft for measuring altitude of said aircraft, means responsive to said range means and to said altimeter means for selecting certain of said signals in accordance with said range and said altitude, and for rejecting others of said signals, means for transmitting signals selected by said means for selecting, means aboard each of said plurality of aircraft for receiving said signals transmitted from the remainder of said plurality of aircraft, and means responsive to said received signals aboard each of said plurality of signals for indicating simultaneously the positions of each of said remainder of said plurality of aircraft.

36. In combination, aboard each of a plurality of aircraft, an omni-directional range receiver for deriving signals defining periodic time intervals which are invariable with respect to bearing of said aircraft from a predetermined geographic position, and for deriving further signals comprising pulses having each a time position with respect to one of said time intervals which is representative of bearing, range means aboard said aircraft for measuring range of said aircraft from said predetermined geographic position, altimeter means aboard said aircraft for measuring altitude of said aircraft, means responsive to said range means and to said altimeter means for selecting certain of said signals in accordance with said range and said altitude, and for rejecting others of said signals, means for transmitting signals selected by said means for selecting, means aboard each of said plurality of aircraft for receiving said signals transmitted from the remainder of said plurality of aircraft, means responsive to said received signals aboard each of said plurality of signals for indicating simultaneously the positions of each of said remainder of said plurality of aircraft, means aboard each of said plurality of aircraft for receiving said signals transmitted from the remainder of said plurality of aircraft, said pulses as received from each of said aircraft significant of the distance, bearing and altitude thereof, and means aboard each of said plurality of aircraft for rejecting pulses representative of predetermined values of distance, altitude and bearing, and for visually interpreting the significance of unrejected pulses in terms of altitude, bearing and distance of aircraft.

37. In a system for providing a visual display of the range, bearing and altitude of a remote craft, in response to a single signal indicative of range in terms of the time position of said signal with respect to a first time base, of bearing in terms of the time position of said signal with respect to a second time base, and of altitude in terms of the time position of said signal with respect to a third time base, a first cathode ray tube having a first cathode ray beam, means synchronized with said first and second time bases for causing said first cathode ray beam to trace a polar plan-position plot, a second cathode ray tube having a second cathode ray beam, means synchronized with said second and third time bases for causing said second cathode ray beam to trace a polar plan-position plot, a third cathode ray tube having a third cathode ray beam, means synchronized with said first and third time bases for causing said third cathode ray beam to trace a plot of range against altitude in rectilinear coordinates, each of said cathode ray tube indicators comprising a beam intensity control electrode, and means responsive to said signal for intensifying said beams simultaneously.

38. The combination in accordance with claim 37 wherein is provided means for generating gating waves synchronized with said time bases for preventing application to said control electrode of signals representative of predetermined ranges of distance, bearing or altitude.

39. The combination in accordance with claim 38 wherein said visual display is provided aboard an aircraft, and wherein said predetermined ranges are predetermined in accordance with the distance, bearing and altitude of said aircraft.

40. The combination in accordance with claim 37 wherein is provided means for generating gating waves synchronized with said time bases for preventing application to said control electrode of said signals representative of predetermined ranges of distance, bearing and altitude, and wherein is further provided means for delineating portions of said plots corresponding with said predetermined ranges of distances, bearing and altitude.

41. In combination, a station having means for transmitting pulses having time positions simultaneously with respect to each of at least three different repetitive time intervals, the time positions of each of said pulses with respect to said time intervals being representative simultaneously of the values of three quantities, a remote receiver for said pulses, said receiver comprising means for translating said pulses into visual indications of the values of said quantities, said receiver comprising means for rejecting pulses occurring without a predetermined range of times within at least one of said time intervals, and means for visually indicating said range of times in terms of a range of values of one of said quantities.

42. In combination, a station having means for transmitting pulses having time positions simultaneously with respect to each of at least three repetitive time intervals, the time positions of each of said pulses with respect to said time intervals being representative simultaneously of the values of three quantities, a remote receiver for said pulses, said receiver comprising means for translating said pulses into visual indications of the values of said quantities, said receiver comprising means for accepting pulses occurring simultaneously within predetermined ranges of each of said time intervals, and for visually indicating said predetermined ranges of said time intervals.

43. In combination, a plurality of relatively remote stations having each means for generating and transmitting pulses, each pulse having time positions simultaneously with respect to each of three repetitive time intervals, means for establishing said time intervals in common to each of said stations, means for establishing the time positions of said pulses generated and transmitted at each of said stations simultaneously with respect to each of said time intervals in accordance with values of each of three parameters, respectively, receiving means for said pulses at each of said stations, gating means associated with said receiving means for excluding from said receiving means pulses originating at any of said remote stations which fall within a predetermined range of values of time positions within at least one of said repetitive time intervals, and means for visually indicating the limits of said predetermined range of values.

44. In combination, a plurality of relatively remote stations having each means for generating and transmitting pulses, each pulse having time positions simultaneously with respect to three repetitive time intervals, means for establishing said time intervals in common to each of said stations, means for establishing the time position of said pulses generated and transmitted at each of said stations simultaneously with respect to each of said time intervals in accordance with values of each of three parameters, respectively, receiving means for said pulses at each of said stations, gating means associated with said receiving means for admitting pulses originating at any of said remote stations which fall only and simultaneously within predetermined ranges of values of time positions within said at least three repetitive time intervals, and means for visually indicating the limits of said predetermined ranges of values.

45. In combination, means for establishing aboard each of a plurality of movable objects a triplet of time intervals, means for transmitting from each of said objects a single pulse having a time position of navigational significance simultaneously with respect to all of said time intervals, means for receiving and translating said pulse into visual indications of the value of said navigational quantities at the remainder of said object, means for rendering said receiving and translating means operative only for predetermined overlapping portions of all of said time intervals, and means for translating said overlapping portions of all of said time intervals into visual indications of the time limits of said time intervals.

46. In combination, means for establishing a first, a second and a third time base, of mutually ascending orders of magnitude, respectively, means for generating a radiant energy pulse having time positions simultaneously with respect to each of said time bases in accordance with a first, a second and a third information bearing value, respectively, a radio receiver for said pulse, and a plurality of translating indicators coupled to said receiver for translating said pulse into visual indication of the said values, said indicators comprising cathode ray tubes having visual indicating faces, means for establishing coordinate systems in the face of each of said cathode ray tubes, each coordinate system utilizing a different pair of said time bases for establishing the units of the coordinate system, said cathode ray tubes each further comprising a beam intensifier electrode, and means for applying pulse output of said receiver simultaneously to each of said beam intensifier electrode, means for rendering said receiving and translating means operative for predetermined fractional portions only of all of said time intervals, and means for establishing on said faces of each of said cathode ray tubes visual indications of values of said predetermined fractional portions of said time intervals.

MARCEL WALLACE.

REFERENCES CITED

The following references are of record in the file of this patent:

UNITED STATES PATENTS

| Number | Name | Date |
| --- | --- | --- |
| 2,212,558 | Blumlein | Aug. 27, 1940 |
| 2,403,626 | Wolff et al. | July 9, 1946 |
| 2,421,017 | Deloraine et al. | May 27, 1947 |
| 2,437,300 | Labin | Mar. 9, 1948 |
| 2,438,903 | Deloraine et al. | Apr. 6, 1948 |